(12) United States Patent
Yeap et al.

(10) Patent No.: US 10,750,083 B2
(45) Date of Patent: Aug. 18, 2020

(54) SYSTEMS AND METHODS FOR PROCESSING DIGITAL IMAGE DATA REPRESENTING MULTIPLE VIEWS OF AN OBJECT OF INTEREST

(71) Applicant: Motorola Solutions, Inc., Chicago, IL (US)

(72) Inventors: Ting Wei Yeap, Air Itam (MY); Bing Qin Lim, Jelutong (MY); Chew Yee Kee, Alor Setar (MY); Sen Yan Tan, Bukit Mertajam (MY); Chun Meng Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 55 days.

(21) Appl. No.: 15/947,151

(22) Filed: Apr. 6, 2018

(65) Prior Publication Data
US 2019/0312985 A1    Oct. 10, 2019

(51) Int. Cl.
*H04N 5/232* (2006.01)
*H04N 1/00* (2006.01)
(Continued)

(52) U.S. Cl.
CPC ..... *H04N 5/23222* (2013.01); *G06F 3/04845* (2013.01); *G06F 16/51* (2019.01);
(Continued)

(58) Field of Classification Search
CPC ............. H04N 1/00183; H04N 1/2125; H04N 5/23206; H04N 5/23222; H04N 5/232933;
(Continued)

(56) References Cited

U.S. PATENT DOCUMENTS 7,299,417 B1    11/2007  Barris et al.
7,853,100 B2    12/2010  Sundstrom et al.
(Continued)

OTHER PUBLICATIONS

QuickTime VR, Wikipedia at << https://en.wikipedia.org/wiki/QuickTime_VR>>, 3 pages, printed Apr. 5, 2018, page last edited Sep. 27, 2017.

(Continued)

*Primary Examiner* — Daniel M Pasiewicz
(74) *Attorney, Agent, or Firm* — Baker Botts L.L.P.

(57) ABSTRACT

Systems and methods for processing digital image data representing multiple views of an object of interest use a sparse set of digital images along with object of interest profiling to provide a photo gallery for evidence-related workflows. Digital images are related to each other on the basis of common objects of interest represented in the images and their orientations within the views depicted in each image. Object of interest profile datasets, including spatial orientation data, enable efficient tracking of photography sessions in which a set of prescribed views of an object of interest are meant to be captured, as well as object-orientation-based photo gallery navigation. The systems recognize of a set of physical gestures that enable a user to intuitively navigate among digital images depicting different views of an object of interest based on how they were physically related to each other when captured.

20 Claims, 17 Drawing Sheets

(51) Int. Cl.
    *G06K 9/32*      (2006.01)
    *G06T 7/73*      (2017.01)
    *G06F 16/51*      (2019.01)
    *H04N 1/21*      (2006.01)
    *G06F 3/0484*      (2013.01)
    *G06F 16/583*      (2019.01)

(52) U.S. Cl.
    CPC ......... *G06F 16/583* (2019.01); *G06K 9/3208* (2013.01); *G06T 7/74* (2017.01); *H04N 1/00183* (2013.01); *H04N 1/2125* (2013.01); *H04N 5/23206* (2013.01); *H04N 5/232933* (2018.08); *H04N 5/232941* (2018.08); *G06F 2203/04806* (2013.01)

(58) Field of Classification Search
    CPC ... H04N 5/232941; G06T 7/74; G06F 3/0484; G06F 16/58; G06F 16/583
    See application file for complete search history.

(56) References Cited

U.S. PATENT DOCUMENTS

| | | | |
|---|---|---|---|
| 8,405,740 | B2 | 3/2013 | Nichols et al. |
| 8,655,052 | B2 | 2/2014 | Spooner et al. |
| 8,803,992 | B2 | 8/2014 | Shingu et al. |
| 9,369,662 | B2 | 6/2016 | Lammers et al. |
| 9,686,088 | B2 | 6/2017 | Papakipos et al. |
| 2007/0043748 | A1 | 2/2007 | Bhalotia et al. |
| 2008/0069449 | A1 | 3/2008 | Cho et al. |
| 2008/0310688 | A1 | 12/2008 | Goldberg |
| 2009/0179895 | A1 | 7/2009 | Zhu et al. |
| 2009/0234473 | A1* | 9/2009 | Andersson ............... G01C 9/06 700/94 |
| 2013/0151523 | A1 | 6/2013 | Hsi |
| 2013/0201354 | A1* | 8/2013 | LaScolea ............... G06F 3/005 348/207.1 |
| 2013/0293686 | A1* | 11/2013 | Blow ..................... G06T 7/55 348/50 |
| 2014/0247325 | A1* | 9/2014 | Wu ................... H04N 5/23206 348/39 |
| 2014/0320702 | A1 | 10/2014 | Tsubusaki |
| 2015/0029346 | A1* | 1/2015 | Sieger ................ H04N 5/23222 348/207.1 |
| 2015/0154229 | A1 | 6/2015 | An et al. |
| 2015/0213784 | A1* | 7/2015 | Jafarzadeh ............... G09G 5/00 345/163 |
| 2015/0215526 | A1* | 7/2015 | Jafarzadeh .............. G06F 3/012 348/218.1 |
| 2016/0253814 | A1 | 9/2016 | Fathi et al. |
| 2017/0034409 | A1 | 2/2017 | Chen et al. |
| 2017/0094023 | A1 | 3/2017 | Jack et al. |
| 2018/0103209 | A1* | 4/2018 | Fischler ............. G06F 3/04815 |
| 2019/0028637 | A1* | 1/2019 | Kolesov .................. G06F 3/011 |

OTHER PUBLICATIONS

Google Street View at <<https://www.google.com/streetview/understand/>>, 9 pages, printed Apr. 5, 2018.

Convert Photos into 3D Models with ReCap 360-Complete Workflow by Autodesk ReCap 360 at <<https://knowledge.autodesk.com/search-result/caas/video/youtube/watch-v-BLxJGFzX0Qc.html>>, 6 pages, 2018, copyright 2018.

Reality Capture is Faster Than You Expect by CapturingReality, <<https://www.capturingreality.com/>>, 5 pages, copyright 2017.

Structure from motion, Wikipedia at <<https://en.wikipedia.org/wiki/Structure_from_motion>>, page last edited on Mar. 4, 2018, printed Apr. 6, 2018, 6 pages.

The new power tool for home improvement by Canvas at <<http:/canvas.io>>, 6 pages, copyright 2018, printed Apr. 6, 2018.

Leica Pegasus: Backpack Wearable Mobile Mapping Solution at <<http://leica-geosystems.com/en-us/products/mobile-sensor-platforms/capture-platforms/leica-pegasus-backpack>>, 7 pages, printed Apr. 6, 2018.

3D reconstruction from multiple images, Wikipedia at <<https://en.wikipedia.org/wiki/3D_reconstruction_from_multiple_images>>, 1 page, printed Apr. 6, 2018.

MobileFusion: Research project turns regular mobile phone into 3D scanner by Microsoft blog editor Allison Linn, Aug. 24, 2015, 3 pages.

Dacuda 3D SLAM Scan technology at <<https://dacuda.com/technology/>>, 6 pages, printed Apr. 6, 2018.

\* cited by examiner

SYSTEMS AND METHODS FOR PROCESSING DIGITAL IMAGE DATA REPRESENTING MULTIPLE VIEWS OF AN OBJECT OF INTEREST

BACKGROUND OF THE INVENTION

When investigating the scene of a crime, each piece of evidence must be documented photographically, showing its location, its appearance, and the orientation of the object in the scene. Standards have been developed for documenting crime scenes and particular objects of interest within those scenes to assist with the investigation. These standards define a set of prescribed views for the scene and for the objects of interest, including requirements to include wide angle views, mid-range views, and close-up views of the scene and each piece of evidence. An electronic photo gallery for displaying the photos taken during such an investigation can be organized based on a timeline, an event, or a location at which the photos were taken, or based on the similarity of the content of the photos. During an investigation of an incident, a public safety officer might need to collect photos of the scene from multiple angles and devices, all of which might be added to the photo gallery.

When the photos are taken, various factors can affect the sequence in which the photos are taken, such as the availability of a light source, the weather, or the relative rates of deterioration for different pieces of evidence. Therefore, the photos might be taken in a sequence that does not provide a good viewing experience for an investigator who is reviewing the photo gallery at a later time. For example, when an investigator reviews the photos taken at the scene of a crime or other incident in a photo gallery, the investigator might want to view the photos taken of the evidence at particular angles, zoom depths, or distances. However, correlations between the photos in the photo gallery might be unclear, given that they were taken at a variety of angles, zoom depths, and distances. In addition, multiple interactions with a user interface might be required to navigate from one photo in the photo gallery to reach a related photo taken at a desired angle, zoom depth, or distance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
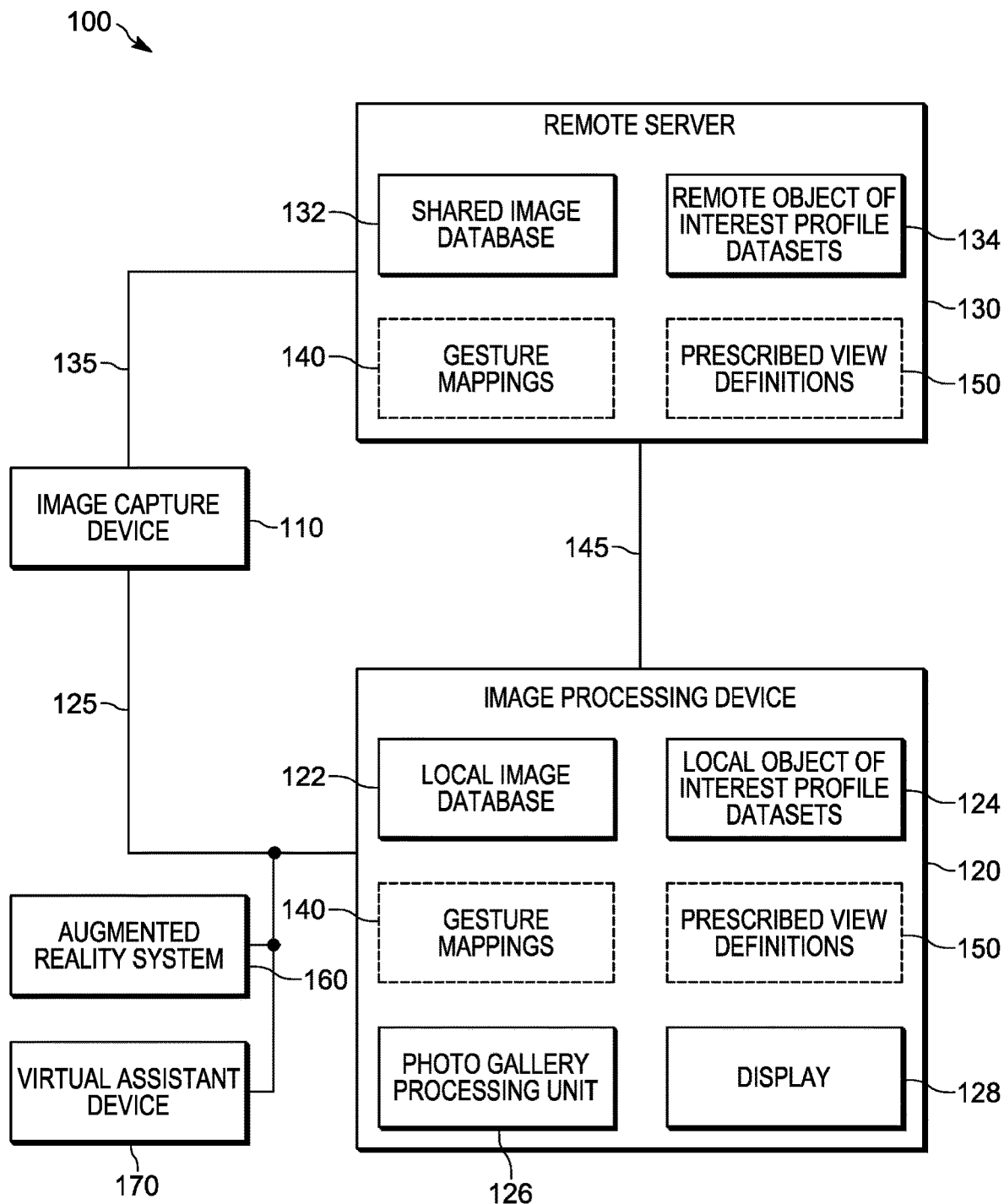
FIG. 1 is a block diagram of a system for processing digital image data representing multiple views of an object of interest, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods, apparatus, and non-transitory, computer-readable storage media for processing data associated with digital images. In one embodiment, a disclosed method includes obtaining, for each of multiple digital images, image data representing a respective view depicted in the digital image and spatial orientation data associated with the digital image. The method also includes identifying, using the image data, an object of interest present in the respective views depicted in two or more of the digital images, and creating a profile dataset for the object of interest. The profile dataset includes, for each of the two or more digital images, image association data representing a record of an association between the object of interest and the digital image and view orientation data representing a record of a relationship between the respective view depicted in the digital image and the respective view depicted in another one of the two or more digital images. The view orientation data is based at least on the spatial orientation data for the two or more digital images. The method also includes receiving, while a first one of the two or more digital images is displayed by a display device, data representing a first navigation gesture detected by an input interface. The received data is mapped to a first view characteristic indicative of a predefined view of the object of interest selected for display. The method also includes, based at least on the received data, the first view characteristic, and the profile dataset for the object of interest, identifying a second one of the two or more digital images having the first view characteristic and initiating display of the identified second digital image by the display device.

In one embodiment, a disclosed electronic image processing device includes a display device, input interface circuitry operable to detect and differentiate multiple navigation gestures, and a photo gallery processing unit. Data representing each of the navigation gestures is mapped to a respective predefined view characteristic. The photo gallery processing unit is operable to obtain, for each of multiple digital images, image data representing a respective view depicted in the digital image and spatial orientation data associated with the digital image. The photo gallery processing unit is further operable to identify, using the image data, an object of interest present in the respective views depicted in two or more of the plurality of digital images, and to create a profile dataset for the object of interest. The profile dataset includes, for each of the two or more digital images, image association data representing a record of an association between the object of interest and the digital image and view orientation data representing a record of a relationship between the respective view depicted in the digital image and the respective view depicted in another one of the two or more digital images. The view orientation data is based at least on the spatial orientation data for the two or more digital images. The photo gallery processing unit is further operable to receive, while a first one of the two or more digital images is displayed by the display device, data representing a first navigation gesture detected by an input interface. The received data is mapped to a first view characteristic indicative of a predefined view of the object of interest selected for display. The photo gallery processing unit is further operable to, based at least on the received data, the first view characteristic, and the profile dataset for the object of interest, identify a second one of the two or more digital images having the first view characteristic and to initiate display of the identified second digital image by the display device.

In one embodiment, a disclosed non-transitory, computer-readable storage medium has program instructions stored thereon that when executed by an electronic processor cause the processor to obtain, for each of multiple digital images, image data representing a respective view depicted in the digital image and spatial orientation data associated with the digital image. When executed, the program instructions further cause the processor to identify, using the image data, an object of interest present in the respective views depicted in two or more of the digital images and to create a profile dataset for the object of interest. The profile dataset includes, for each of the two or more digital images, image association data representing a record of an association between the object of interest and the digital image and view orientation data representing a record of a relationship between the respective view depicted in the digital image and the respective view depicted in another one of the two or more digital images. The view orientation data is based at least on the spatial orientation data for the two or more digital images. When executed, the program instructions further cause the processor to receive, while a first one of the two or more digital images is displayed by a display device, data representing a first navigation gesture detected by an input interface. The received data is mapped to a first view characteristic indicative of a predefined view of the object of interest selected for display. When executed, the program instructions further cause the processor to, based at least on the received data, the first view characteristic, and the profile dataset for the object of interest, identify a second one of the two or more digital images having the first view characteristic and to initiate display of the identified second digital image by the display device.

In at least some embodiments of the present disclosure, the systems and methods described herein for processing digital image data representing multiple views of an object of interest may create a profile dataset for the object of interest including spatial orientation data and other metadata associated with each digital image in which the object of interest is represented. For example, the image data for each digital image taken at the scene of a crime or other incident may be analyzed to identify objects of interest. Data reflecting associations between the objects of interest and the digital images in which they are represented may be recorded in the respective profile datasets for each object of interest. In addition, metadata associated with obtaining each of the digital images in which a given object of interest is represented, including camera orientation attributes, a timestamp, or location data, may be captured or calculated and added to the profile dataset for the given object of interest.

In at least some embodiments, the metadata stored in the profile dataset for a given object of interest may be analyzed to determine whether all of a set of prescribed views of the given object of interest have been taken at the scene. If not, a visual or audible notification may be generated and presented to a photographer or investigator indicating a prescribed view that is not represented in the image data collected at the scene. In at least some embodiments, the metadata stored in the profile dataset for a given object of interest may be used to display digital image data representing multiple views of a given object of interest in a photo gallery based on the respective orientations of the given object of interest in each of the views. In at least some embodiments, the metadata in the profile dataset for a given object of interest may also be used to implement an object-orientation-based navigation mechanism for selecting particular ones of the multiple views of a given object of interest for display based on the detection and differentiation of various navigation gestures.

FIG. 1 is a block diagram of a system 100 for processing digital image data representing multiple views of an object of interest, in accordance with some embodiments. In the illustrated embodiment, system 100 includes an image capture device 110, an electronic image processing device 120, and a remote server 130. In some embodiments, remote server 130 may reside in a cloud computing environment. In some embodiments, remote server 130, or at least some shared data stored thereon, may be accessible to authorized public safety personnel in multiple jurisdictions or locations. Image capture device 110 may, for example, be a stand-alone digital camera or a digital camera integrated within another electronic device including, in some embodiments, image processing device 120. In the illustrated embodiment, image capture device 110 is communicatively coupled to image processing device 120 over local interconnect 125, which may be a wired or wireless interconnect. In the illustrated embodiment, image capture device 110 is communicatively coupled to remote server 130 over network interconnect 135. In at least some embodiments, image capture device 110 may be operable to capture camera orientation attributes and other metadata associated with each digital image captured by image capture device 110 and to provide image data and the metadata for each digital image to image processing device 120 over local interconnect 125 or to remote server 130 over network interconnect 135.

In various embodiments, image processing device 120 may be, without limitation, a desktop computing device or a portable electronic device, such as a smart telephone, a mobile radio, a tablet computer, a wireless controller, a hand held electronic device, or a digital camera. In the illustrated embodiment, image processing device 120 includes local image database 122 in which image data and, in some cases, metadata for a plurality of digital images is stored and display 128. In various embodiments, display 128 may include a suitable display such as, for example, a liquid crystal display (LCD) touch screen or an organic light-emitting diode (OLED) touch screen. In alternative embodiments, display 128 may include a suitable screen without tactile input capability.

In the illustrated embodiment, image processing device 120 also includes local object of interest profile datasets 124 and a photo gallery processing unit 126 for processing image data for multiple digital images and metadata associated with the digital images. At least some of the metadata associated with the digital images may be included in various ones of the local object of interest profile datasets 124. Similarly, remote server 130 includes a shared image database 132 in which image data and, in some cases, metadata for a plurality of digital images is stored. Some of the data residing in shared image database 132 may be duplicated in local image database 122. Remote server 130 also includes remote object of interest profile datasets 134, some of which may be duplicates of particular ones of the local object of interest profile datasets 124 residing on image processing device 120. In addition, one or both of image processing device 120 and remote server 130 may include gesture mappings 140, each of which comprises data defining mappings between data representing various navigation gestures and respective object-orientation-based view characteristics. One or both of image processing device 120 and remote server 130 may also include prescribed view definitions 150, each of which may comprise data defining sets of prescribed views for particular scenes, objects of interest, or types of crimes or other incidents, for example.

In the illustrated embodiment, system 100 includes augmented reality system 160 for providing visual notifications or other guidance to a user of system 100. In various embodiments, augmented reality system 160 may include a head-mounted display system, a helmet display, an electronic eye glass, display goggles, or a wearable digital display. For example, in various embodiments, augmented reality system 160 may include one or more of an augmented reality display device, an infrared projector, a display projector, a lens system, a transceiver for receiving data from image processing device 120, an eye tracking assembly, a memory, and an image sensor coupled to an electronic processor (not shown in FIG. 1). In the illustrated embodiment, system 100 also includes virtual assistant device 170, which may provide audible notifications or other guidance to a user of system 100. In this example, augmented reality system 160 and virtual assistant device 170 are communicatively coupled to image processing device 120 over local interconnect 125. In other embodiments, a system for processing digital image data representing multiple views of an object of interest may include more, fewer or different elements than those of system 100 as depicted in FIG. 1.

Figure 2A:
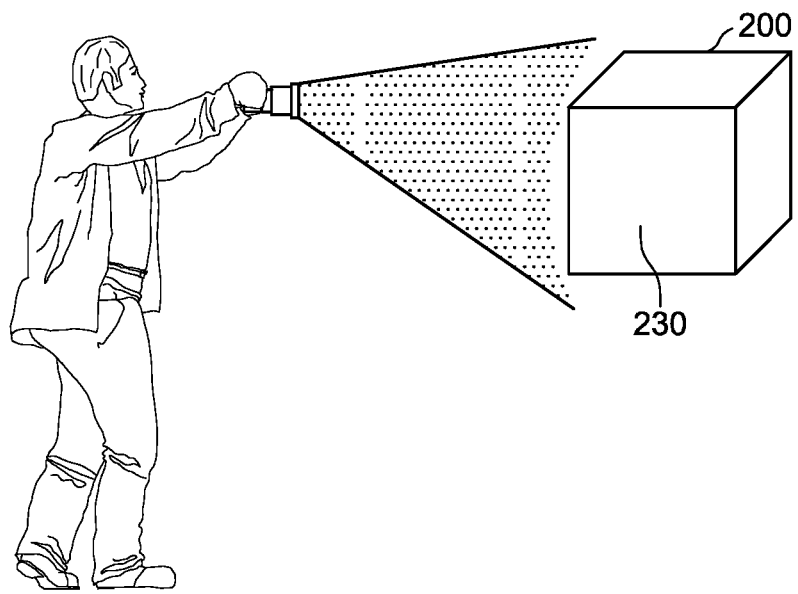
FIGS. 2A-2D illustrate the capture of image data for an object of interest from different view angles, in accordance with some embodiments.
Figure 2B:
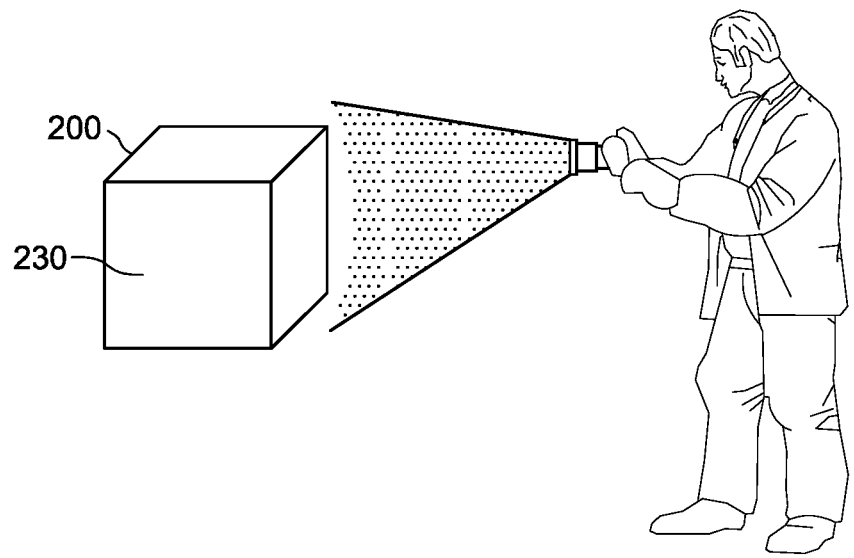
Figure 2C:
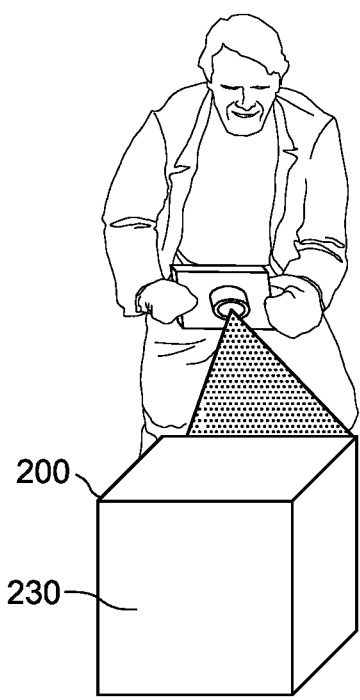
Figure 2D:
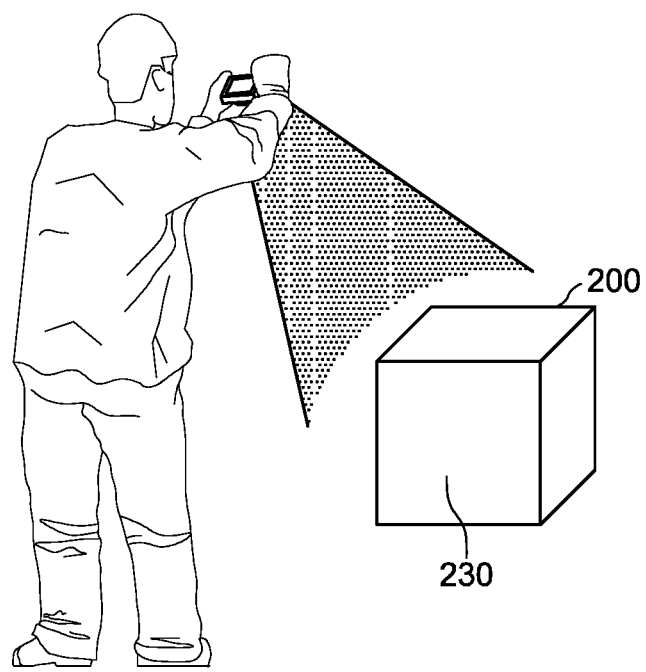

FIGS. 2A-2D illustrate the capture of image data for an object of interest 200 from different view angles, in accordance with some embodiments. Specifically, FIG. 2A illustrates the capture of a left side view of object of interest 200, FIG. 2B illustrates the capture of a right side view of object of interest 200, FIG. 2C illustrates the capture of a back view of object of interest 200, and FIG. 2D illustrates the capture of a top view of object of interest 200. In this example, the designations of the left side view, right side view, top view, and back view are assigned relative to a designated key view of the object of interest. Specifically, side 230 of object of interest 200 has been designated as the front side of object of interest 200 and the view designations of the images captured as shown in FIGS. 2A-2D are made relative to a view of front side 230 (not shown in the figures).

In some embodiments, metadata including spatial orientation data may be captured, such as by an accelerometer, gyroscope, magnetometer, or other sensor, or calculated, such as by processing image data or sensor data, for each digital image depicting a respective view in which a given object of interest is present. The metadata may be captured by a stand-alone digital camera that captures the image data or by a digital camera or other image capture device integrated with an electronic device on which the captured image data is to be processed for display or displayed. In some embodiments, the metadata captured for each digital image may include timestamp data indicating when the digital image was taken, orientation data indicating the direction from which the digital image was taken, or location data indicating where the digital image was taken. The image data may be formatted in accordance with any suitable digital image format including, without limitation, a raster format, a vector format, a compound format including both pixel and vector data, or a stereo format.

Figure 2E:
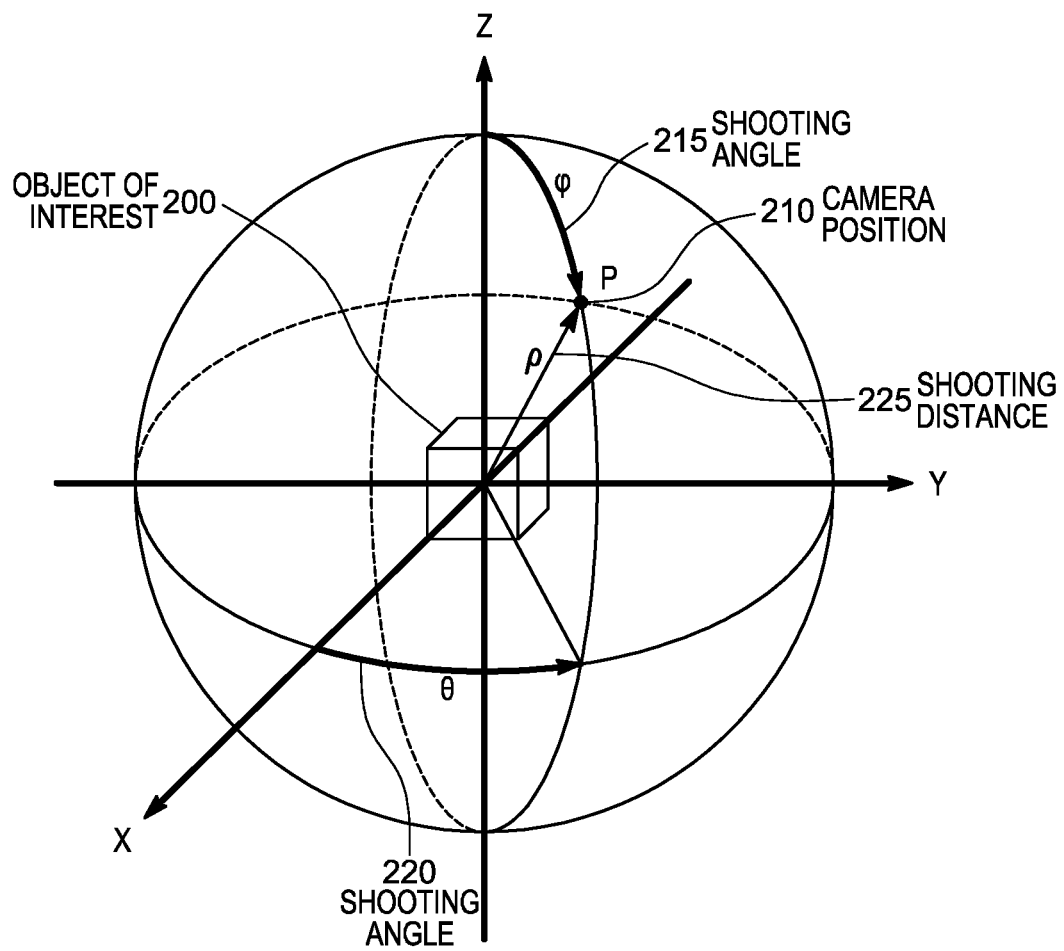
FIG. 2E is a block diagram illustrating camera orientation attributes defined for an object of interest and a camera in a spherical coordinate system, in accordance with some embodiments.

FIG. 2E is a block diagram illustrating camera orientation attributes defined for object of interest 200 and a camera in a spherical coordinate system, in accordance with some embodiments. More specifically, the camera orientation attributes are defined in terms of two shooting angles and a shooting distance associated with the capturing of a digital image of object of interest 200 by the camera. In the illustrated example, the shooting distance 225 represents the radial distance, $\rho$, from the center of object of interest 200 to camera position 210, P. The first shooting angle 215 is a polar angle, $\varphi$, representing camera position 210, P, as measured with respect to the z axis. The second shooting angle 220 is an azimuth angle, $\theta$, of an orthogonal projection of camera position 210, P, on the x-y plane, as measured with respect to the x axis.

In at least some embodiments, values for these camera orientation attributes, along with other spatial orientation data, may be stored in the object of interest profile dataset for object of interest 200 for each digital image in which object of interest 200 is represented. Table 1 below illustrates a portion of the metadata that may be stored in an example object of interest profile dataset, in accordance with some embodiments.

TABLE 1

Example object of interest profile dataset

Object of interest identifier: car3

| φ | θ | P | image file | view orientation | timestamp | location |
|---|---|---|---|---|---|---|
| 3° | 5° | 2 meters | car3-7.jpeg | front-mid | | |
| 11° | 176° | 2 meters | car3-13.jpeg | back-mid | | |
| 7° | 88° | 2 meters | car3-4.jpeg | side-left-mid | | |
| 85° | 15° | 2 meters | car3-26.jpeg | top-mid | | |
| 86° | 10° | 10 meters | car3-15.jpeg | top-wide | | |
| 8° | 87° | 12 meters | car3-21.jpeg | side-left-wide | | |

In some embodiments, camera orientation attributes captured for each digital image may include six degree-of-freedom attributes sensed by one or more of a compass, an accelerometer, a gyroscope, or a magnetometer instead of, or in addition to, the camera orientation attributes described above in reference to a spherical coordinate system. In some embodiments, the location data for each digital image may be recorded in terms of Global Positioning System (GPS) coordinates. The timestamp data for each digital image may be recorded in terms of any of a variety of formats in different embodiments. In one example, the timestamp data may be recorded in the form yyyy-MM-dd-HH.mm.ss.fffff. In various embodiments, one or more elements of the metadata stored in an object of interest profile dataset may be generated using video analytics, object recognition, or an analysis of data received from one or more motion sensors.

As previously noted, in certain fields, such as public safety and crime scene investigations, operational standards have been developed for documenting the scene of a crime or other incident and various objects of interest in the scene to assist with the investigations. In some cases, these operational standards define a set of prescribed views for the scene and for the objects of interest in terms of the magnification levels, angles, and distances from which a collection of digital images should be captured. For example, the operational standards may include requirements for multiple overview images each comprising a wide angle view covering the entire scene from a different angle, including from above the scene. The standards may include requirements for multiple mid-range views, which may illustrate the relationships between the object of interest and other visible features depicted in the scene, including their relative positions and sizes and the distances between them. The standards may also include requirements for multiple close-up views in which additional details of the scene or of the objects of interest are visible.

In some cases, the standards may specify that the digital images should be captured while the camera is positioned above the subject of the images and parallel to the floor, or at right angles to the subject of the images, to eliminate potential distance distortions. The standards may define different sets of prescribed views for particular types of objects of interest, such as shoe prints or tire marks. The standards may also include requirements for lighting based on the available ambient lighting. For example, the standards may specify that the digital images should be captured using an electronic flash or other lighting source at multiple different angles.

In some embodiments, an object of interest profile dataset, or a view checklist derived from an object of interest profile dataset, may be used to track the status of a photography session in which a collection of prescribed views of an object of interest are meant to be captured. For example, a digitally stored object of interest profile dataset or view checklist may include respective entries for each prescribed view to be electronically mapped to a corresponding digital image. As various digital images are taken and metadata associated with the digital images is captured or calculated, the metadata may be added to the object of interest profile dataset or used to populate a view checklist. An example view checklist is illustrated in Table 2 below, in accordance with some embodiments. In this example, for each prescribed view, the status may be "pending," "partial" or "complete". A status of "pending" may indicate that no digital image taken so far depicts the prescribed view. A status of "partial" may indicate that at least one digital image depicts a portion of the prescribed view, but no digital image taken so far depicts the prescribed view in its entirety. A status of "complete" may indicate that at least one digital image depicts the prescribed view in its entirety.

TABLE 2

Example view checklist for an object of interest

| Prescribed view | Zoom depth | Status | Digital image |
|---|---|---|---|
| top view | wide angle | complete | car3-15.jpeg |
| top view | mid-range | complete | car3-26.jpeg |
| top view | close-up | pending | |
| side view (left): 0° to 90° | wide angle | complete | car3-21.jpeg |
| side view (left): 0° to 90° | mid-range | partial | car3-4.jpeg |
| side view (left): 0° to 90° | close-up | pending | |
| side view (right): 180° to 270° | wide angle | pending | |
| side view (right): 180° to 270° | mid-range | pending | |
| side view (right): 180° to 270° | close-up | pending | |
| front view: 90° to 180° | wide angle | pending | |
| front view: 90° to 180° | mid-range | complete | car3-7.jpeg |
| front view: 90° to 180° | close-up | pending | |
| back view: 270° to 360° | wide angle | pending | |
| back view: 270° to 360° | mid-range | complete | car3-13.jpeg |
| back view: 270° to 360° | close-up | pending | |
| bottom view | wide angle | pending | |
| bottom view | mid-range | pending | |
| bottom view | close-up | pending | |

In some embodiments, in response to detecting that a photography session in which a set of prescribed views of an object of interest is being captured is likely ending, the object of interest profile dataset or view checklist may be analyzed to determine whether all of the prescribed views have been taken. For example, a photography session may be considered likely to be ending in response to detecting certain conditions including, but not limited to, electronically detecting that the photographer is reviewing a photo gallery including one or more digital images linked to the object of interest in the profile dataset, detecting that a predetermined amount of time has passed since a digital image has been captured by a camera that captured one of the digital images or stored, detecting that a predetermined time has been reached, such as the time at which the photography session was scheduled to end, detecting that the photographer or camera that captured one of the digital images has crossed a predetermined geofence boundary, such as a geofence defined for the scene of a crime or other incident, or detecting that the photographer or camera that captured one of the digital images has entered a vehicle, such as by detecting a connection between an internal communications network of the vehicle and a personal area network through which a mobile device, camera, or other image capture device communicates with other electronic devices or higher level networks. The internal communications network of the vehicle may interconnect components of the vehicle and enable communication with the vehicle in accordance with any of a variety of communications protocols including, but not limited to, Controller Area Network (CAN), Local Interconnect Network (LIN), or Vehicle Area Network (VAN) interface protocols. The personal area network may enable communication between a mobile device, camera, or other image capture device and other electronic devices or the internal communications network of the vehicle using a wireless technology such as WiFi, Wireless Ethernet, Bluetooth, IEEE (Institute of Electrical and Electronics Engineers) 802.15, Infrared Data Association (IrDA), or ZigBee, among other technologies.

If, after analyzing the object of interest profile dataset or view checklist, it is determined that one or more of the prescribed views is missing, a visual or audible notification may be generated and provided to the photographer or to an investigator as a reminder to complete the set of prescribed views. Similarly, if it is determined that the status of a prescribed view is "partial," a notification may be provided indicating that only a portion of the prescribed view is depicted in any of the digital images taken so far, and that a digital image depicting the complete view or a remaining portion of the prescribed view should be taken. The notifications generated in response to determining that the prescribed set of views is incomplete may take the form of a voice reminder from a virtual assistant device, a text or graphic displayed on an electronic device such as a pop-up notification or alert on a mobile device, or an augmented reality visualization depicting, for example, the proposed position at which the photographer should stand when capturing the missing view or the angle from which the photographer should capture the missing view, along with the camera position, view angle, or zoom depth for the missing view.

Figure 3:
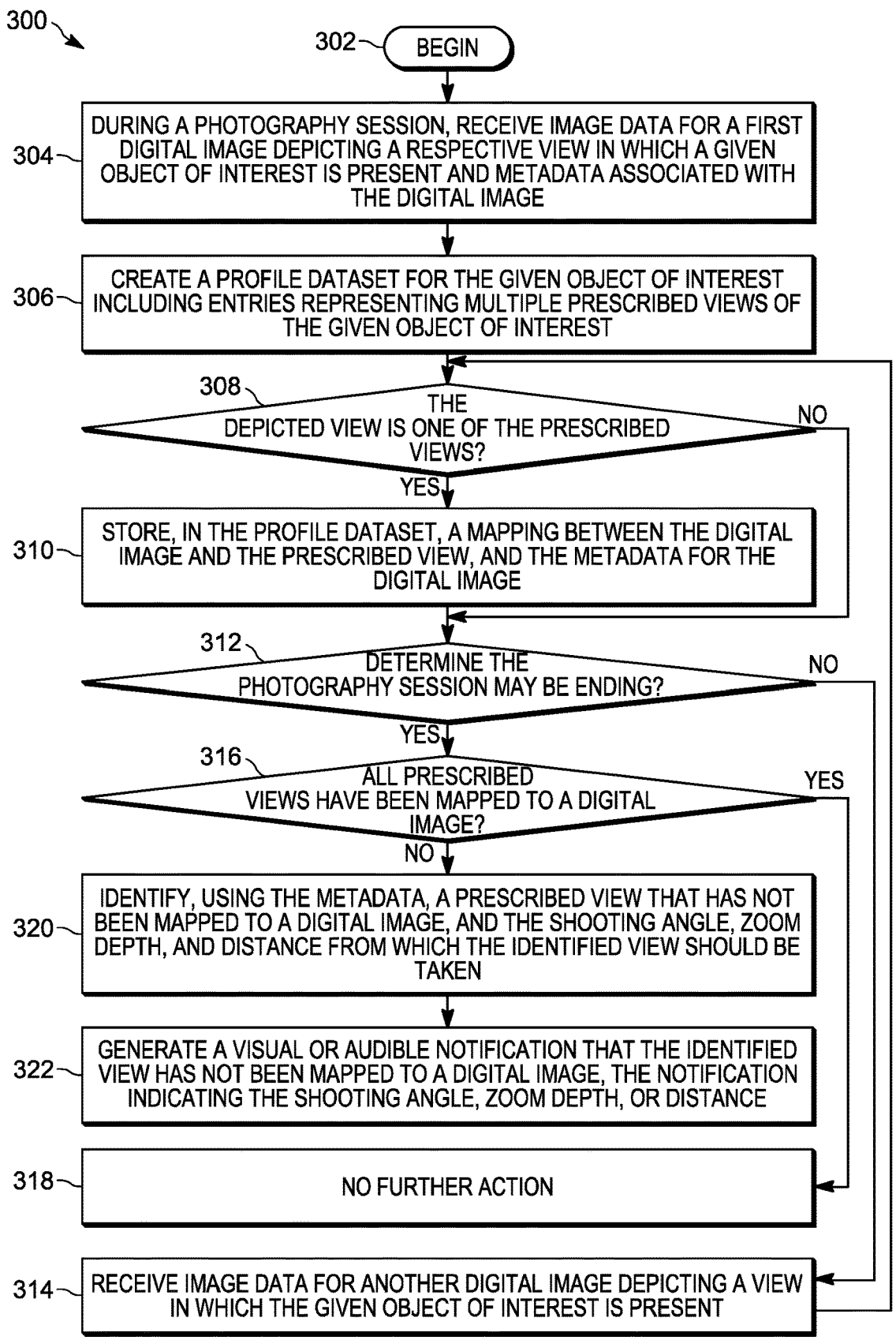
FIG. 3 is a flowchart of a method of creating a profile dataset for multiple prescribed views of an object of interest, in accordance with some embodiments.

Referring now to FIG. 3, there is provided a flow diagram of an example method 300 for creating a profile dataset for multiple prescribed views of an object of interest, in accordance with some embodiments. While a particular order of operations is indicated in FIG. 3 for illustrative purposes, the timing and ordering of such operations may vary where appropriate without negating the purpose and advantages of the examples set forth in detail throughout the remainder of this disclosure. In various embodiments, some or all of the operations of method 300 may be performed by photo gallery processing unit 126 of image processing device 120 illustrated in FIG. 1.

In this example embodiment, method 300 begins with block 302 and continues with block 304 where, during a photography session, image data for a first digital image depicting a respective view in which a given object of interest is present and metadata associated with the digital image are received. The metadata may include one or more of spatial orientation data including camera orientation attributes, timestamp data indicating when the digital image was taken, and location data indicating where the digital image was taken.

In block 306, a profile dataset is created for the given object of interest including entries representing multiple prescribed views of the given object of interest. In addition to the metadata received along with the image data for the first digital image, the profile dataset may be configured to store image association data representing a record of an association between the object of interest and the first digital image and view orientation data representing a record of a relationship between the respective view depicted in the first digital image and the respective view depicted in another one of multiple digital images in which the object of interest is represented. The view orientation data may be based at least on the spatial orientation data for the two or more digital images. For example, the view depicted in one of the digital images in which the object of interest is represented, such as the view depicted in the first captured digital image, may be designated as a key view of the object of interest. In this example, the view orientation data stored in the object of interest profile dataset may describe the respective views depicted in the digital images in which the object of interest is represented in terms their orientations relative to the orientation of the object of interest depicted in the key view. In other embodiments, an object recognition module operating on photo gallery processing unit 126 illustrated in FIG. 1 may designate a key view for an object of interest based on criteria that is specific to an object type. For example, where the object recognition module is operable to identify the portion of a particular object that would generally be referred to as the "front" of the object, a mid-range view of the "front" of the object may be designated as the key view of the object and the orientations of other views of the object may be described relative to this key view.

Referring again to FIG. 3, in block 308, it is determined whether or not the depicted view is one of the prescribed views meant to be captured during the photography session. If so, method 300 continues at block 310. Otherwise, method 300 proceeds to block 312. Determining whether or not the depicted view is one of the prescribed views may include determining, based on the camera orientation attributes or other metadata associated with the digital image, whether the depicted view fits the criteria for one of the prescribed views enumerated in the profile dataset for the object of interest or in a corresponding view checklist. The prescribed views enumerated in the view checklist may be dependent on the particular object type or on the particular incident type.

At block 310, a mapping between the digital image and the prescribed view is stored in the object of interest profile dataset. In one example, an identifier of, or link to, a file containing the image data for the digital image may be recorded in the entry representing the depicted view. In addition, some or all of the received metadata that is associated with the digital image may be stored in the profile dataset.

At block 312, if it is determined that the photography session may be ending, method 300 proceeds to block 316. Otherwise, method 300 proceeds to block 314. For example, a photography session may be considered likely to be ending if the photographer is reviewing a photo gallery including digital images linked to the object of interest in the profile dataset, if a predetermined amount of time has passed since a digital image has been captured or stored, if a predetermined ending time for the photography session has been reached, if the photographer or camera has crossed a predetermined geofence boundary for the scene of a crime or other incident, or if the photographer or camera has entered a vehicle, among other conditions. At block 314, image data is received for another digital image depicting a view in which the given object of interest is present, after which method 300 returns to block 308. Note that the operations shown in blocks 308 to 314 may be repeated one or more times until, at block 312, a determination is made that the photography session may be ending.

At block 316, in response to a determination that the photography session may be ending, it is determined, based at least on the profile dataset for the object of interest, whether or not all prescribed views have been mapped to a respective digital image. If so, method 300 proceeds to block 318. Otherwise, method 300 continues at block 320. For example, the profile dataset for the object of interest or a view checklist derived from the profile dataset for the object of interest may be analyzed to determine the status of each of the prescribed views or to determine whether a link to an image file has been mapped to each of the prescribed views.

At block 318, in response to a determination that all of the prescribed views have been mapped to respective digital images, no further action may be taken. At block 320, using the metadata, a prescribed view that has not been mapped to a digital image is identified, along with the shooting angle, zoom depth, and distance from which the identified view should be taken. At block 322, a visual or audible notification that the identified view has not been mapped to a digital image is generated. The notification may indicate the shooting angle, zoom depth, distance or other pertinent information associated with the missing view. For example, generating the notification may include constructing and initiating a voice notification by a virtual assistant device, creating and sending a text message, or creating and displaying a graphical image or photographic image that is annotated to describe the missing view and how to capture it. In another example, generating the notification may include generating an augmented reality visualization depicting information such as a location at which a digital image including the object of interest should be captured, a distance from which a digital image including the object of interest should be captured, or a direction from which a digital image including the object of interest should be captured. In one example, generating the notification may include generating an augmented reality visualization depicting the location at which the photographer should stand when capturing the missing view, a proposed position or pose of the photographer when capturing the missing view, or the angle from which the photographer should capture the missing view.

In some embodiments, creating the profile dataset for the object of interest further includes at least one of determining, based at least on timestamp data for the two or more digital images in which the object of interest is represented, that the digital images were taken within a window of time of a predetermined length, and determining, based at least on location data for the two or more digital images, that the digital images were taken within a physical area of a predetermined size.

Figure 4A:
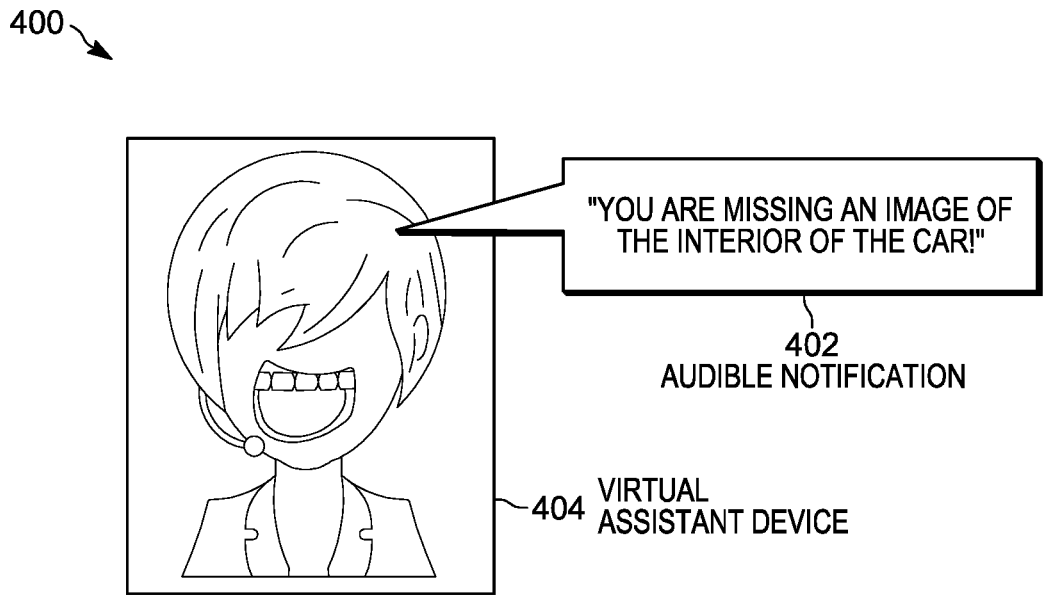
FIGS. 4A-4D are block diagrams illustrating example mechanisms for providing a notification that a prescribed view of an object of interest has not been mapped to a digital image, in accordance with some embodiments.
Figure 4B:
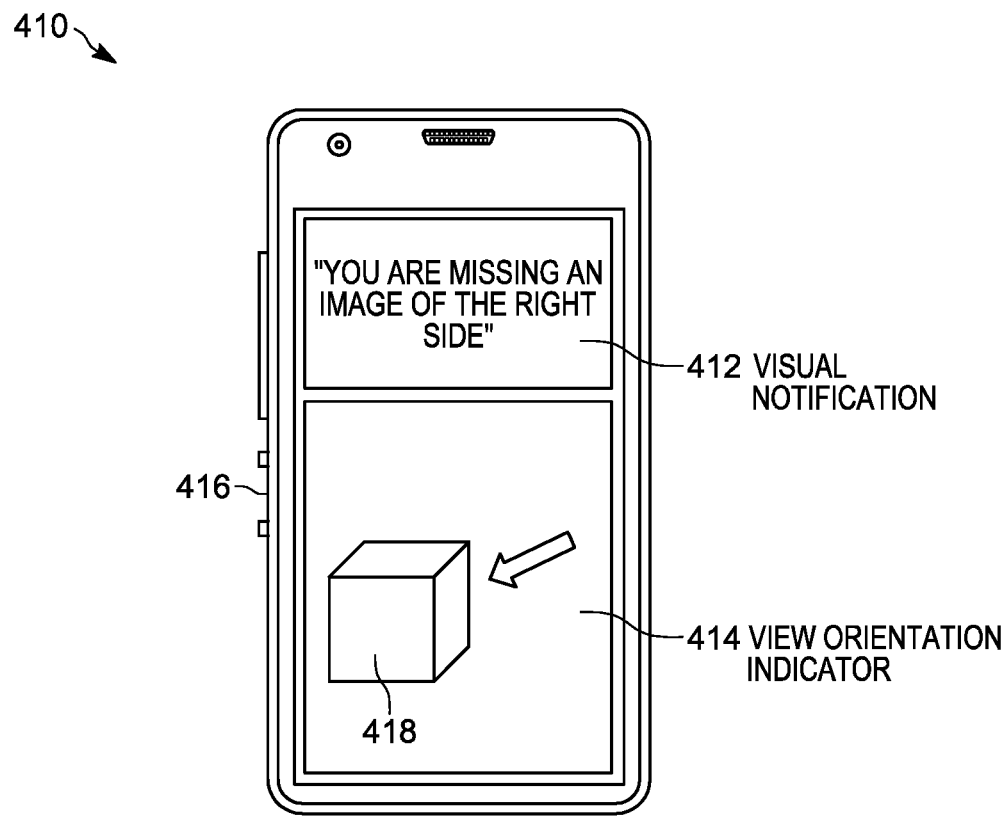

FIGS. 4A-4D are block diagrams illustrating example mechanisms for providing a notification that a prescribed view of an object of interest has not been mapped to a digital image, in accordance with some embodiments. For example, FIG. 4A illustrates a notification mechanism 400 in which a virtual assistant device 404 provides an audible notification 402 indicating that no digital image is mapped to a prescribed interior view of an object of interest, in this case, a car. FIG. 4B illustrates a notification mechanism 410 in which a visual notification 412 is presented on a display of mobile electronic device 416 indicating that no digital image is mapped to a prescribed right side view of an object of interest 418. In this example embodiment, a view orientation indicator 414 is also presented on a display of mobile electronic device 416 indicating the angle from which the missing digital image should be captured.

Figure 4C:
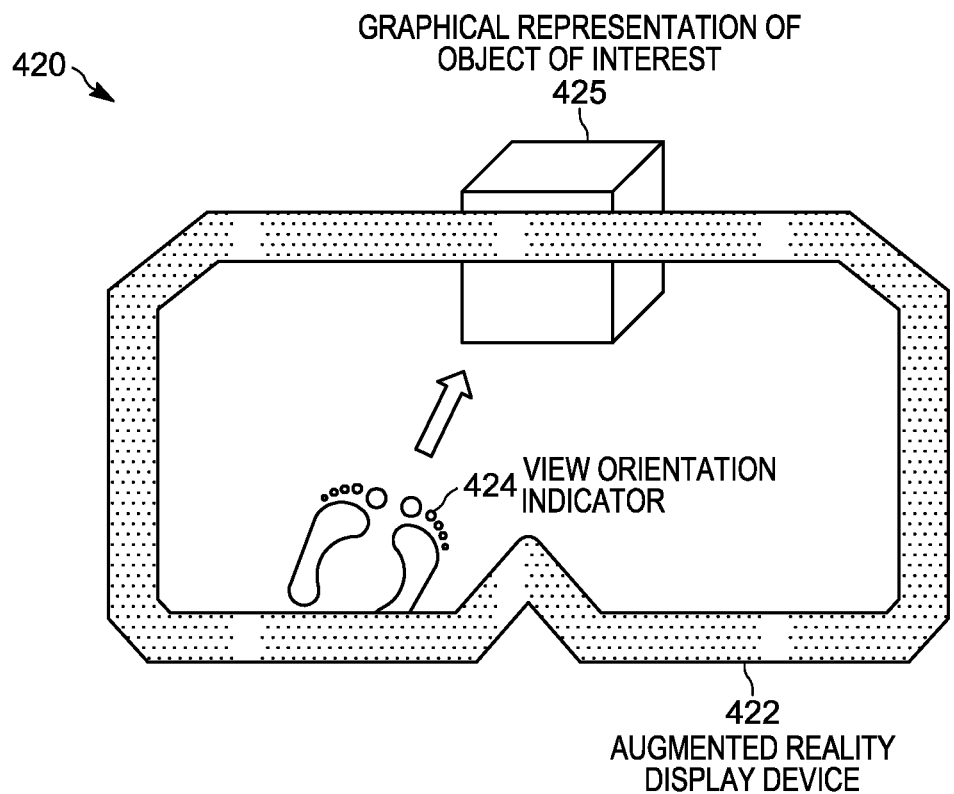
Figure 4D:
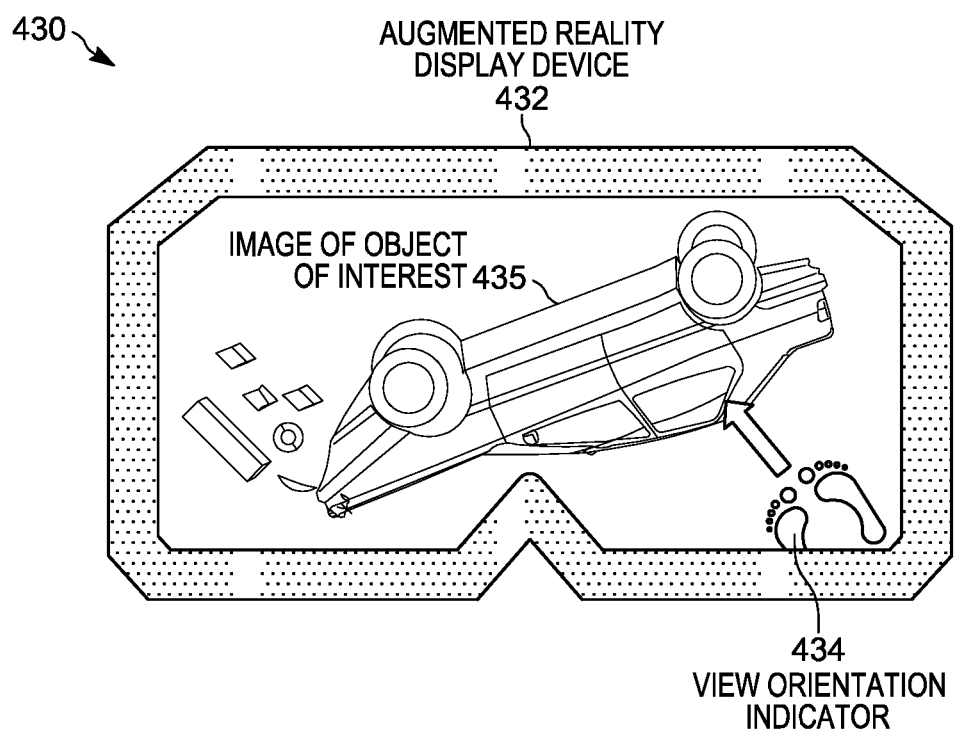

FIG. 4C illustrates a notification mechanism 420 in which a graphical representation of an object of interest 425 is presented as a visualization in an augmented reality display device 422. In this example, the visualization also includes a view orientation indicator 424 indicating a position at which the photographer should stand when capturing the missing digital image and the angle at which the missing digital image should be captured. FIG. 4D illustrates a notification mechanism 430 in which one view of an image of an object of interest 435, in this case, a car, is presented in an augmented reality display device 432. In this example, a view orientation indicator 434 is superimposed over the depicted view indicating a position at which the photographer should stand when capturing a digital image for a missing view of object of interest 435 and the angle at which the digital image for the missing view should be captured.

While several example notification mechanisms are illustrated in FIGS. 4A-4D, in other embodiments other notification mechanisms may be used to remind a photographer or investigator to capture a digital image depicting a missing view of an object of interest in a set of prescribed views. In some embodiments, a single notification may identify two or more missing views. In some embodiments, multiple notifications may be provided serially, each indicating one of multiple missing views.

Figure 5:
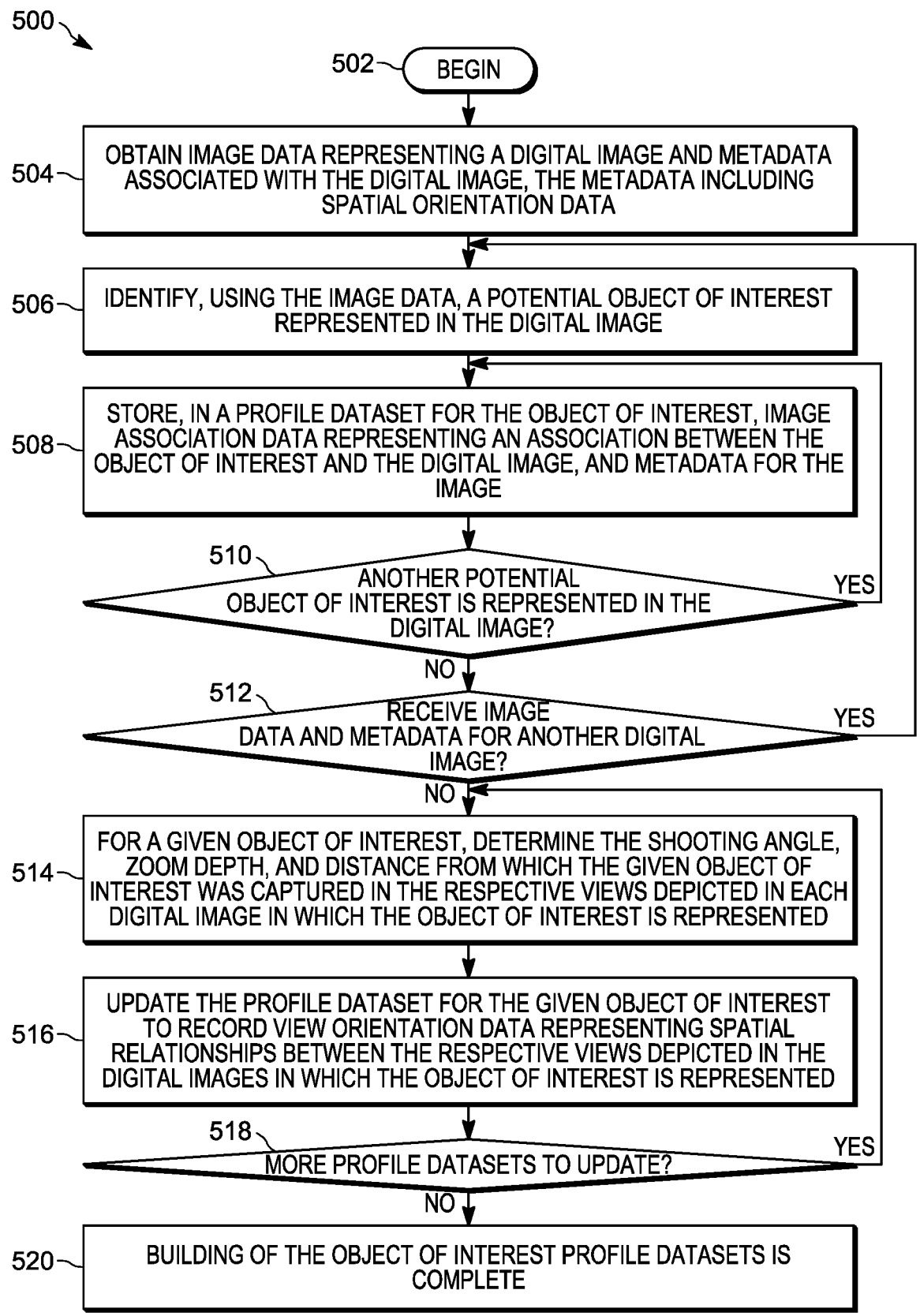
FIG. 5 is a flowchart of a method of populating a profile dataset for an object of interest, in accordance with some embodiments.

Referring now to FIG. 5, there is provided a flow diagram of an example method 500 for populating a profile dataset for an object of interest, in accordance with some embodiments. While a particular order of operations is indicated in FIG. 5 for illustrative purposes, the timing and ordering of such operations may vary where appropriate without negating the purpose and advantages of the examples set forth in detail throughout the remainder of this disclosure. In various embodiments, some or all of the operations of method 500 may be performed by photo gallery processing unit 126 of image processing device 120 illustrated in FIG. 1.

In this example embodiment, method 500 begins with block 502 and continues with block 504, where image data representing a digital image and metadata associated with the digital image are obtained. The digital image and metadata may be obtained by being received from a camera, such as image capture device 110 illustrated in FIG. 1, by querying local image database 122, or by querying shared image database 132, in different embodiments. The metadata may include, among other elements, spatial orientation data such as camera orientation attributes, timestamp data, or location data associated with the digital image.

At block 506, using the image data, a potential object of interest represented in the digital image is identified. In one example, the potential object of interest may be identified automatically by an object recognition module operating on photo gallery processing unit 126. In this example, the object recognition module may be operable to identify a variety of objects that are represented in the digital image, such as a chair, a table, a car, a weapon, a computer, a human person, an animal, or another commonly photographed object. A potential object of interest may also be identified automatically by the object recognition module based on information obtained from an evidence database. For example, if a particular weapon or other object has been tagged or identified in an evidence database as being associated with a crime or other incident and is subsequently identified in the digital image through image processing, the weapon or other object may be identified as a potential object of interest in the digital image. In another example, the potential object of interest may be identified automatically by photo gallery processing unit 126 based on the existence of one or more close-up views of the object in the image data captured so far. In yet another example, the potential object of interest may be selected by a user through an input interface mechanism, such as a touch screen or mouse device, while a digital image in which the object is represented is being displayed, or using a pop-up or pull-down menu presented on display 128 illustrated in FIG. 1. At block 508, image association data representing an association between the object of interest and the digital image and metadata for the digital image are stored in a profile dataset for the object of interest. If the profile dataset has not yet been created, it may be created first, and then at least partially populated.

At block 510, it is determined whether or not another potential object of interest is represented in the digital image. If so, method 500 returns to block 508. Otherwise, method 500 continues with block 512. At block 512, if image data and metadata for another digital image are received, method 500 returns to block 506. Otherwise method 500 continues with block 514. At block 514, for a given object of interest, the shooting angle, zoom depth, and distance from which the given object of interest was captured in the respective views depicted in each digital image in which the object of interest is represented are determined using the metadata.

At block 516, the profile dataset for the given object of interest is updated to record additional metadata, in this case, view orientation data representing spatial relationships between the respective views depicted in the digital images in which the object of interest is represented. The view orientation data may be based at least on the spatial orientation data for the digital images, such as a determined shooting angle, zoom depth, and distance for each digital image. Updating the profile dataset for the object of interest may include calculating, for each of the digital images, the relationship between the respective view depicted in the digital image and the respective view depicted in another one of the digital images based at least on the camera orientation attributes for the digital images, and recording a representation of the relationship as view orientation data in the profile dataset. For example, photo gallery processing unit 126 may perform object recognition, object orientation calculations, and other photogrammetric analyses in order to determine the relationships between the digital images. In some embodiments, the operations illustrated in blocks 514 and 516 might only be applied to objects of interest for which one or multiple close-up views, taken at different angles, are represented in the image data.

At block 518, it is determined whether or not there are more profile datasets to update. If so, method 500 returns to block 514. Otherwise, method 500 proceeds to block 520, where the building of the object of interest profile datasets is complete.

In other embodiments of a method for populating a profile dataset for an object of interest, the profile dataset may be updated as image data and metadata are received for each additional image in which the object of interest is represented rather than through the post-processing of image data and associated metadata that was collected or recorded at different times.

Figure 6:
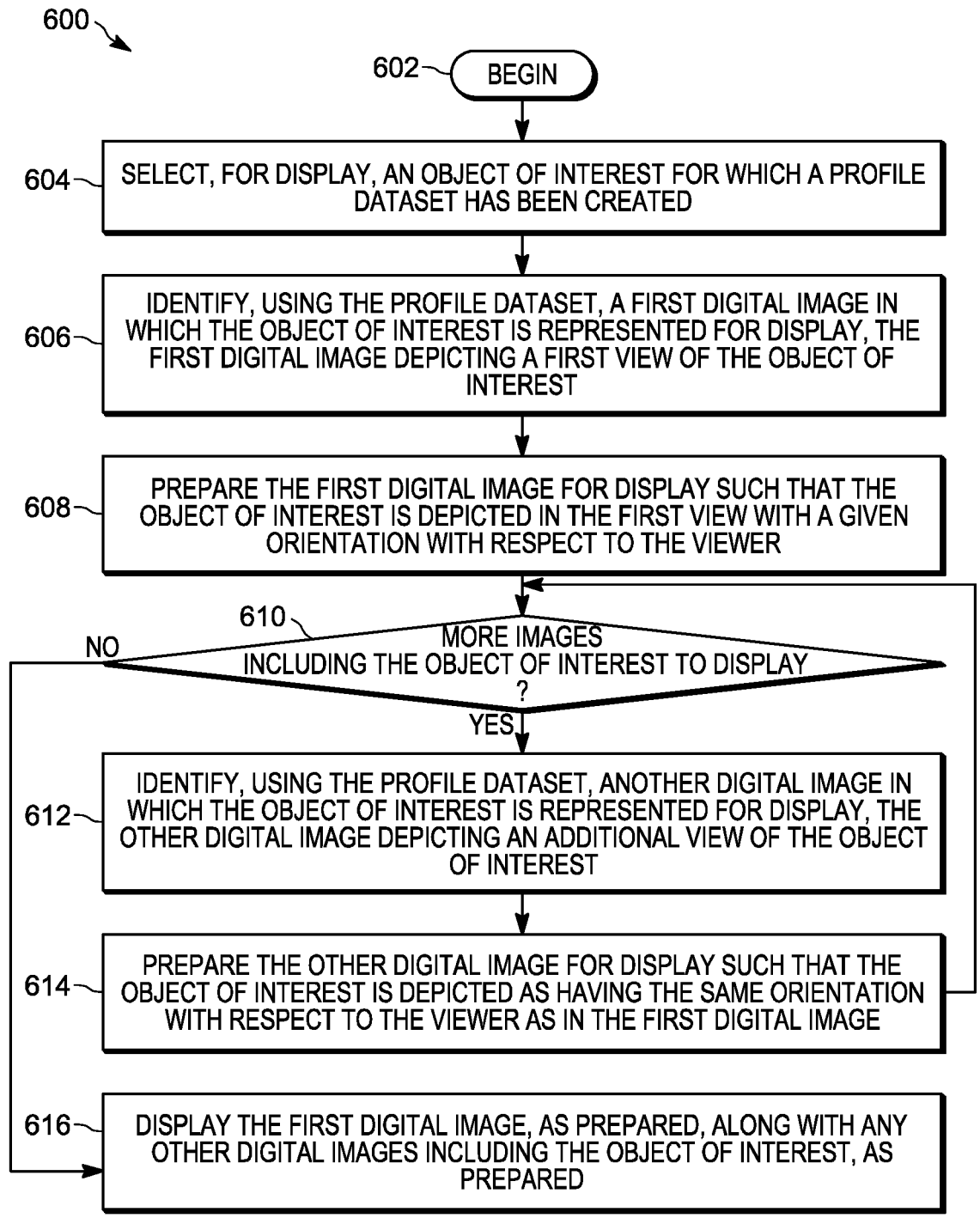
FIG. 6 is a flowchart of a method of simultaneously displaying digital images depicting respective views of an object of interest, in accordance with some embodiments.

Referring now to FIG. 6, there is provided a flow diagram of an example method 600 for simultaneously displaying digital images depicting respective views of an object of interest, in accordance with some embodiments. While a particular order of operations is indicated in FIG. 6 for illustrative purposes, the timing and ordering of such operations may vary where appropriate without negating the purpose and advantages of the examples set forth in detail throughout the remainder of this disclosure. In various embodiments, some or all of the operations of method 600 may be performed by photo gallery processing unit 126 of image processing device 120 illustrated in FIG. 1.

In this example embodiment, method 600 begins with block 602 and continues with block 604, where an object of interest for which a profile dataset has been created is selected for display. For example, the object of interest may be selected from a photo gallery menu, may be selected using a user input mechanism such as a touch screen or mouse device while a digital image in which the object is represented is being displayed, or may be selected using another input mechanism. In another example, the object of interest might not be explicitly selected for display, but may be represented in one or more of the digital images in a folder or directory of digital images selected for display by a user of a photo gallery application.

At block 606, a first digital image in which the object of interest is represented is identified for display using the profile dataset. The first digital image depicts a first view of the object of interest. For example, the first view to be displayed may, by design, be a mid-range view. In some embodiments, the first view to be displayed may be a view designated as a key view of the object of interest relative to which the view orientations of the other views of the object of interest are described. In other embodiments, the first view to be displayed may be a view selected by a user for display in the photo gallery using any suitable user input mechanism. At block 608, the first digital image is prepared for display such that the object of interest is depicted in the first view with a given orientation with respect to the viewer. The given orientation may be designated as a preferred or default view orientation for displaying the first of multiple views of an object of interest. The given orientation may be the original view orientation depicted in the first digital image. If the given orientation is not the original view orientation depicted in the first digital image, preparing the first digital image for display may include rotating the digital image to align it with the given orientation.

At block 610, it is determined whether or not there are more images including the object of interest to display. If so, method 600 continues with block 612. Otherwise, method 600 proceeds to block 616. At block 612, using the profile dataset, another digital image in which the object of interest is represented is identified for display. The other digital image may depict an additional view of the object of interest.

At block 614, the other digital image is prepared for display such that the object of interest is depicted as having the same orientation with respect to the viewer as in the first digital image, after which method 600 returns to block 610. The operations shown in blocks 612 and 614 may be repeated one or more times for each additional image that includes the object of interest. Once there are no additional images including the object of interest, the first digital image is displayed, as prepared, along with any other digital images that include the object of interest, as prepared, as in block 616. In some embodiments, not all of the digital images that include the object of interest may be displayed at once, given the limitations of the display area or the resolution of the display. In this case, method 600 may proceed to block 616 at any time, such as once the number of digital images that include the object of interest approaches the maximum number of digital images that can be displayed at once, or once a predetermined minimum number of digital images that include the object of interest have been prepared for display. In some embodiments, a subset of the digital images that include the object of interest may be selected for display automatically based on spatial orientation data, location data, timestamp data, or other criteria used to group digital images that are to be displayed together.

Figure 7A:
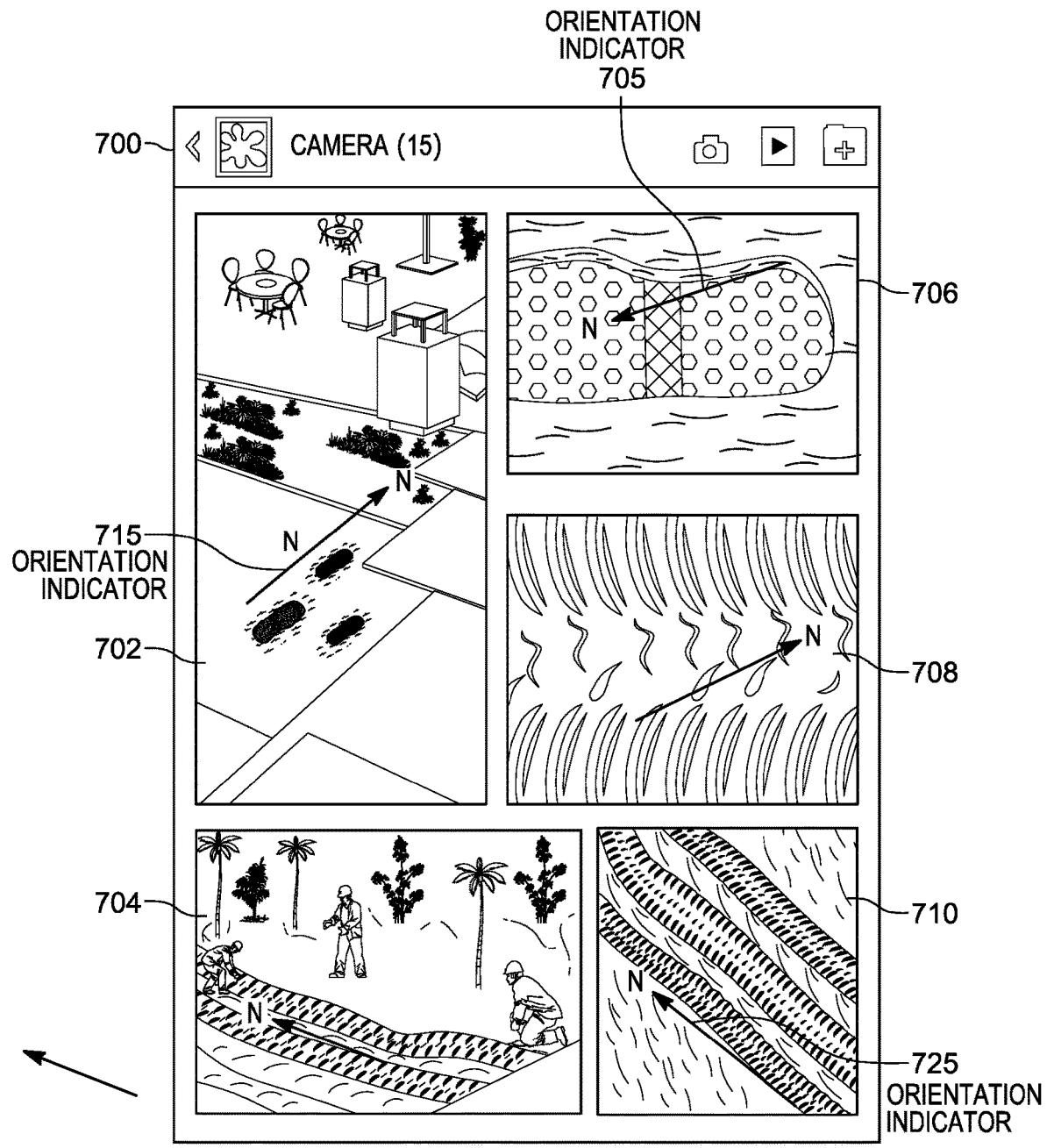
FIGS. 7A and 7B illustrate the simultaneous display of multiple digital images in which an object of interest is represented, in accordance with some embodiments.
Figure 7B:
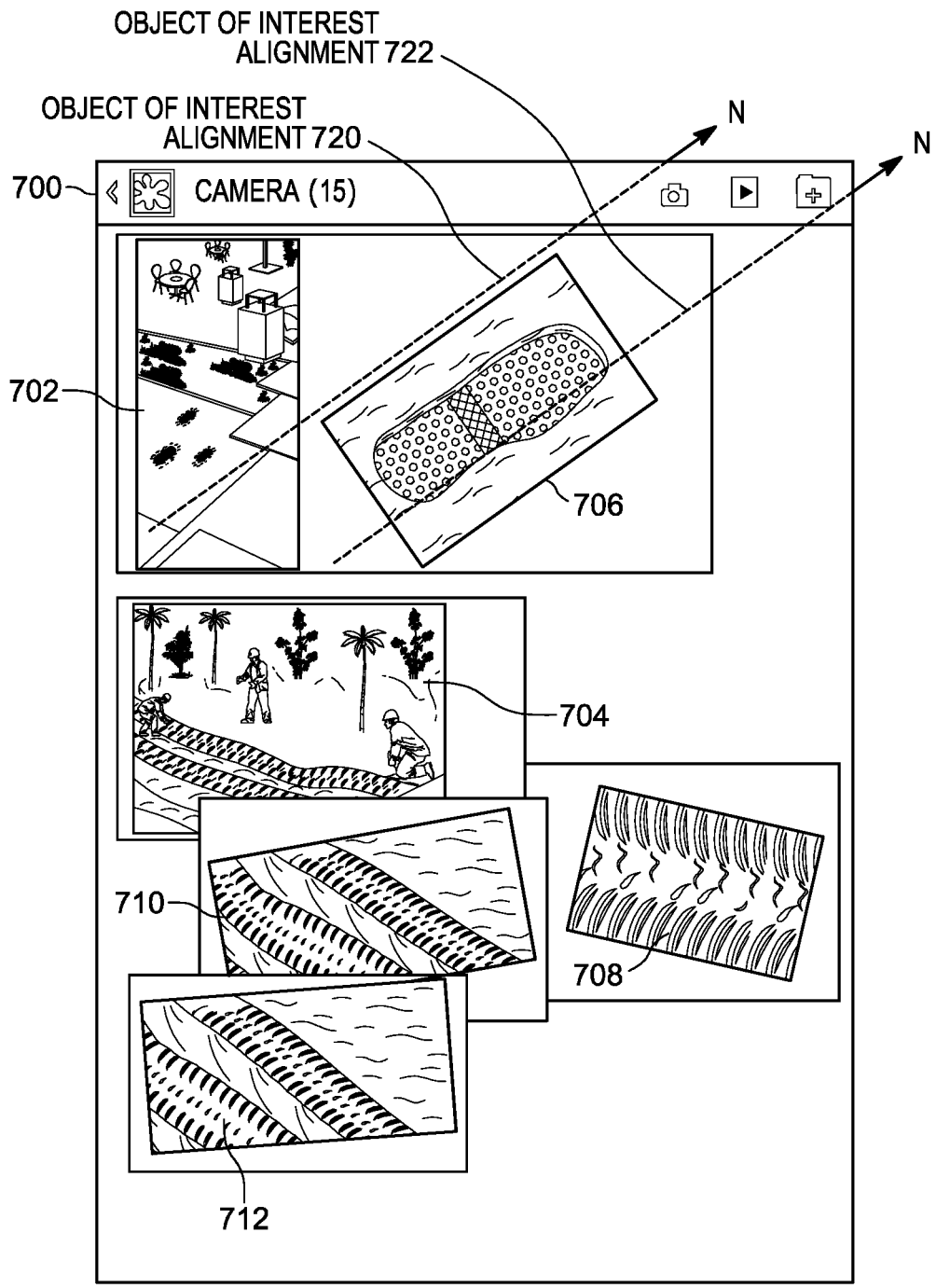

FIGS. 7A and 7B illustrate the simultaneous display by an electronic device 700 of multiple digital images in which an object of interest is represented, in accordance with some embodiments. For example, FIG. 7A illustrates the display of five digital images taken at the scene of a crime or other incident. In this example, digital images 702 and 706 include a common first object of interest, in this case, a shoe print, taken at two different distances or zoom levels. Similarly, digital images 704, 708, and 710 include a second common object of interest, in this case, tire marks, taken from different angles and distances. The digital images may be arranged chronologically based on the times at which they were captured. In some embodiments, the digital images may have been captured in accordance with a predefined sequence for capturing digital images at the scene of a crime or other incident. In one example, the predefined sequence may specify that all of the prescribed wide angle shots should be taken first, followed by all of the prescribed mid-range shots and, finally, all of the prescribed close-up shots. In some embodiments, the digital images may be grouped for simultaneous display based on location information.

In this example, the digital images are shown in their originally captured orientations, making it difficult for the viewer to correlate the multiple views of the common objects of interest. In the illustrated example, each of digital images has been annotated, in some cases manually, to include an orientation indicator identifying a direction that corresponds to north in order to provide an indication of how the digital images are related to each other. For example, digital image 702 has been annotated with orientation indicator 715 and digital image 710 has been annotated with orientation indicator 725, each of which includes an arrow pointing north.

In embodiments in which metadata including spatial orientation data was captured and associated with digital images 702 to 710 and one or more object of interest profile databases were created and populated as described herein, these digital images may be displayed in an object-orientation-based manner instead of, or in addition to, the traditional manner in which they are displayed in FIG. 7A. For example, related digital images, such as digital images taken at different angles but in which a common object of interest is represented, may be grouped together for display and visually associated with each other when displayed.

For example, FIG. 7B illustrates the display of six digital images, including the five digital images shown in FIG. 7A and an additional digital image (digital image 712) that includes the second common object of interest, namely, the tire mark. In this example, digital images 702 and 706 are grouped together in the display based at least on the presence of a common object of interest, namely, the shoe print. In some embodiments, digital images may also be grouped together in the display based on timestamp data for the digital images indicating that the digital images were taken within a window of time of a predetermined length, or based on location data for the digital images indicating that the digital images were taken within a physical area of a predetermined size. In the illustrated example, digital image 706 has been rotated so that the orientation of the shoe print in digital image 706 and the orientation of the shoe print in digital image 702 are aligned. This is illustrated by object of interest alignment markings 720 and 722, both pointing north, which might not be visible in the display but are shown in FIG. 7B for clarity of understanding.

Also illustrated in FIG. 7B are digital images 704, 708, 710, and 712, which are grouped together in the display based on the presence of a common object of interest, namely, the tire mark. In this example, each of digital images 708, 710, and 712 has been rotated so that the orientation of the tire mark in digital images 708, 710, and 712 and the orientation of the tire mark in digital image 704 are aligned. In some embodiments, preparing digital images containing a common object of interest for display may include scaling one or more of the digital images to fit alongside related digital images in the display or so that common features visible in related digital images appear to be approximately the same size.

Note that at least some digital images captured during a photography session, whether or not the session occurs at the scene of a crime or other incident, may include more than one object of interest. These digital images may be displayed differently, such as at a different size, zoom level, or view orientation, when they are included in a gallery of digital images representing selected views of a first object of interest depicted in the images than when they are included in a gallery of digital images representing selected views of a second object of interest depicted in the images.

Figure 8:
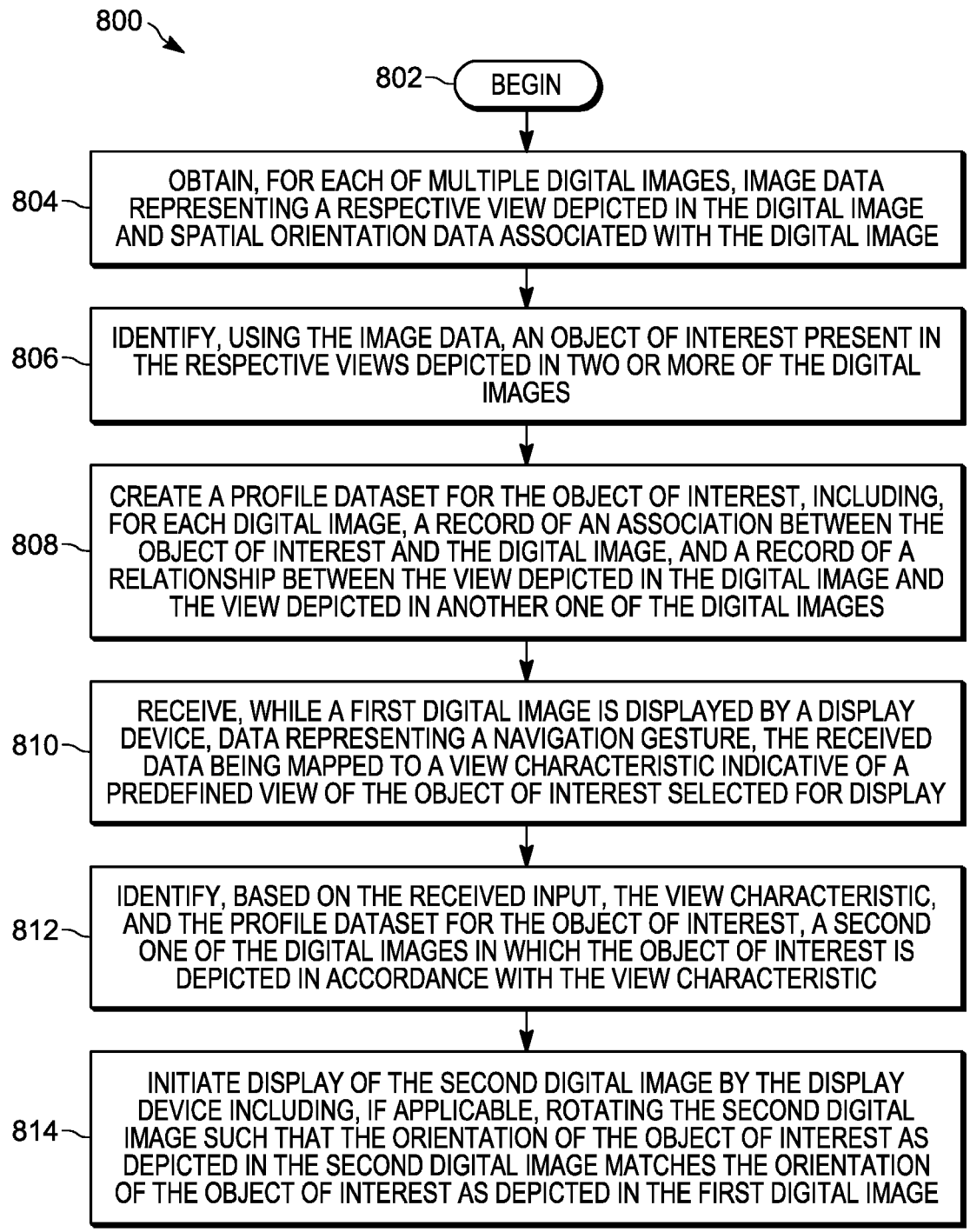
FIG. 8 is a flowchart of a method of processing digital image data representing multiple views of an object of interest, in accordance with some embodiments.

Referring now to FIG. 8, there is provided a flow diagram of an example method 800 for processing digital image data representing multiple views of an object of interest, in accordance with some embodiments. While a particular order of operations is indicated in FIG. 8 for illustrative purposes, the timing and ordering of such operations may vary where appropriate without negating the purpose and advantages of the examples set forth in detail throughout the remainder of this disclosure. In various embodiments, some or all of the operations of method 800 may be performed by photo gallery processing unit 126 of image processing device 120 illustrated in FIG. 1.

In this example embodiment, method 800 begins with block 802 and continues with block 804 where, for each of multiple digital images, image data representing a respective view depicted in the digital image and metadata including spatial orientation data associated with the digital image, such as camera orientation attributes, are obtained. The digital image and metadata may be obtained by being received from a camera, such as image capture device 110 illustrated in FIG. 1, by querying local image database 122, or by querying shared image database 132, in different embodiments. The metadata may also include, among other elements, timestamp data or location data.

At block 806, using the image data, an object of interest present in the respective views depicted in two or more of the digital images is identified, as described herein. At block 808, a profile dataset is created for the object of interest including, for each digital image, a record of an association between the object of interest and the digital image and a record of a relationship between the view depicted in the digital image and the view depicted in another one of the digital images.

At block 810, while a first digital image is displayed by a display device, such as display 128 illustrated in FIG. 1, data representing a navigation gesture is received. The received data is mapped to a view characteristic indicative of a predefined view of the object of interest selected for display. The navigation gesture may be one of multiple navigation gestures detectable and differentiable by an input interface of image processing device 120. In some embodiments, the navigation gestures may include at least one of a rotation gesture in a predefined direction, a zoom out gesture, and a zoom in gesture. In some embodiments, other types of gestures, such as tapping on the right, left, top, or bottom of the screen, or swiping left, right, up, or down, may be redefined to perform different functions when detected and differentiated in the context of the photo galleries described herein than when they are detected in the context of other applications. Each such navigation gesture may define a respective object-orientation-based navigation function for navigating to the next digital image to be displayed. For example, in response to detecting a gesture associated with a particular view characteristic, an object-orientation-based navigation function may be performed to identify, prepare, and display a digital image depicting a view of the object of interest in accordance with the particular view characteristic. The gestures may be detected by an input interface device such as a touch screen, mouse, or another type of input interface mechanism. The respective view characteristic to which each navigation gesture is mapped may include a predefined angle or distance associated with the object of interest relative to the digital image currently being displayed. For example, the view characteristic may indicate a view of the object of interest taken at a predefined view angle, a view of the object of interest taken at a predefined view distance, a view of the object of interest taken at a predefined zoom depth, an interior view of the object of interest, an exterior view of the object of interest, or a map view depicting a location of the object of interest.

At block 812, based on the received input, the view characteristic, and the profile dataset for the object of interest, a second one of the digital images in which the object of interest is depicted in accordance with the determined view characteristic is identified. At block 814, the display of the second digital image by the display device is initiated, which includes, if applicable, rotating the second digital image such that the orientation of the object of interest as depicted in the second digital image matches the orientation of the object of interest as depicted in the first digital image.

Figure 9:
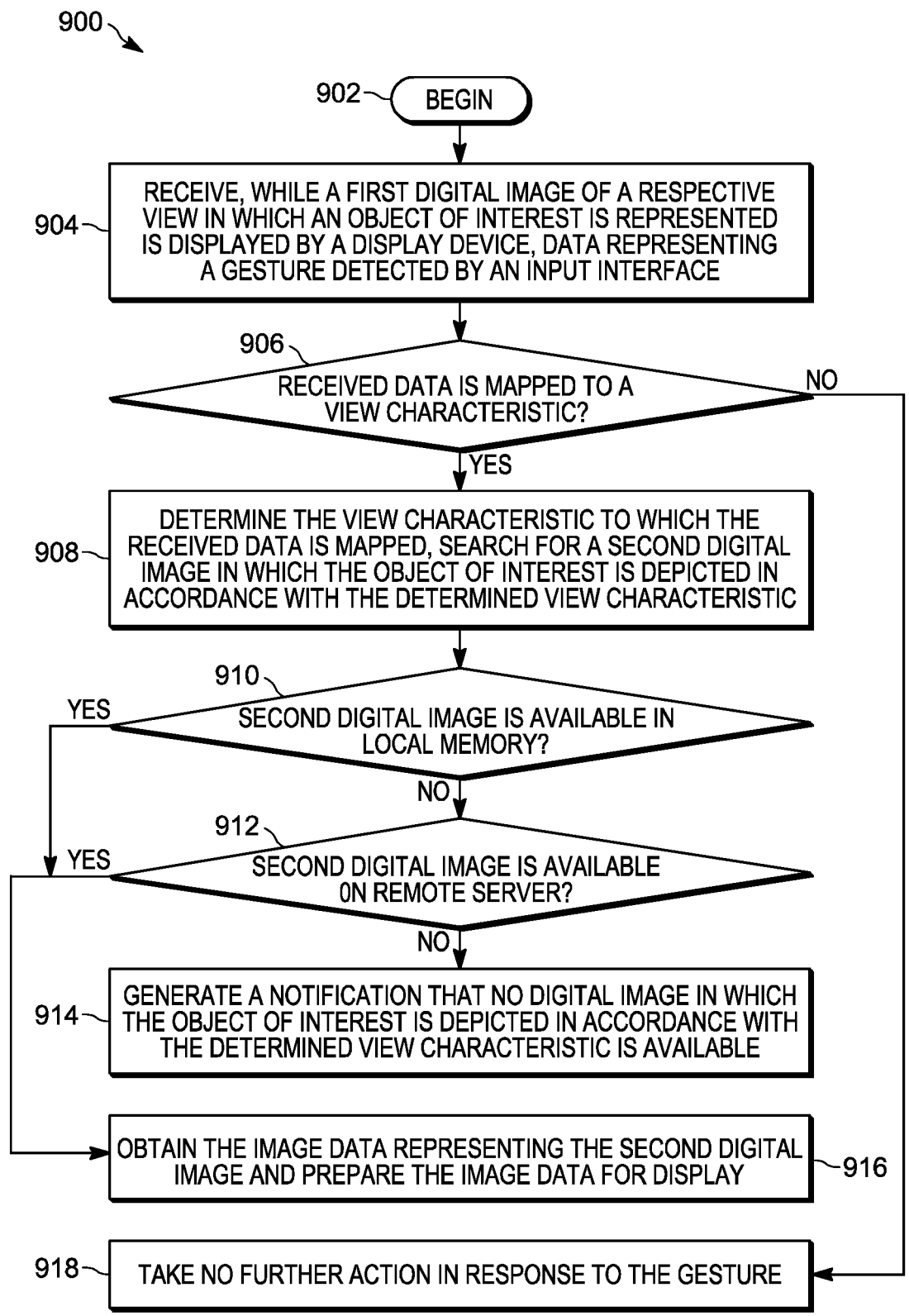
FIG. 9 is a flowchart of a method of processing data to navigate between multiple views of an object of interest, in accordance with some embodiments.

Referring now to FIG. 9, there is provided a flow diagram of an example method 900 for processing data to navigate between multiple views of an object of interest, in accordance with some embodiments. While a particular order of operations is indicated in FIG. 9 for illustrative purposes, the timing and ordering of such operations may vary where appropriate without negating the purpose and advantages of the examples set forth in detail throughout the remainder of this disclosure. In various embodiments, some or all of the operations of method 900 may be performed by photo gallery processing unit 126 of image processing device 120 illustrated in FIG. 1.

In this example embodiment, method 900 begins with block 902 and continues with block 904 where, while a first digital image depicting a respective view in which an object of interest is present is displayed by a display device, data representing a gesture detected by an input interface is received. The first digital image may be displayed, for example, by display 128 of image processing device 120.

At block 906, it is determined whether or not the received data representing the gesture is mapped to a predetermined view characteristic. If so, method 900 continues with block 908. Otherwise, method 900 proceeds to block 918 and no further action is taken in response to the gesture. In this example, the navigation gestures that are detectable and differentiable may include at least one of a rotation gesture in a predefined direction, a zoom out gesture, and a zoom in gesture, at least some of which correspond to a predetermined view characteristic. In this example, the detected gesture might or might not be one of the navigation gestures detectable and differentiable by the input interface for which data representing the gesture is mapped to a predetermined view characteristic.

At block 908, the view characteristic to which the received data representing the gesture is mapped is determined, and a search for a second digital image in which the object of interest is depicted in accordance with the determined view characteristic begins. For example, the view characteristic may indicate a desire to display a view of the object of interest taken at a predefined view angle, a view of the object of interest taken at a predefined view distance, a view of the object of interest taken at a predefined zoom depth, an interior view of the object of interest, an exterior view of the object of interest, or a map view depicting a location of the object of interest.

At block 910, it is determined whether or not a second digital image in which the object of interest is depicted in accordance with the determined view characteristic is available in local memory, such as in local image database 122 or elsewhere in a memory on image processing device 120. If so, method 900 proceeds to block 916. If not, method 900 proceeds to block 912. In the illustrated embodiment, if the desired view of the object of interest is not available in local memory, the search may be extended to a friendly network, such as one shared by multiple public safety jurisdictions or locations. At block 912, it is determined whether or not a second digital image in which the object of interest is depicted in accordance with the determined view characteristic is available on a remote server, such as in shared image database 132 of remote server 130 illustrated in FIG. 1. If so, method 900 proceeds to block 916. If not, method proceeds to block 914. For example, a digital image meeting the search criteria may have been uploaded to shared image database 132 on remote server 130 by a public safety employee using an image capture device that is not communicatively coupled to image processing device 120, or by a public safety employee in a different jurisdiction or location than the public safety employee currently viewing the photo gallery. In some cases, the search criteria may include a specified location, location range, timestamp, or timestamp range in order to filter out images of a similar object of interest or the same object of interest that were captured in association with a different incident or in a different context than the first digital image. At block 916, the image data representing the second digital image is obtained and the image data is prepared for single display, as described herein.

At block 914, a notification is generated indicating that no digital image in which the object of interest is depicted in accordance with the determined view characteristic is available. The notification may be sent to an appropriate public safety employee device, based at least on the location and job function of the public safety employee, and may include a request that an image depicting the object of interest in accordance with the determined view characteristic be captured. For example, if the received data representing the gesture is mapped to a view characteristic indicating that an interior view of a car should be displayed next, and no digital image depicting an interior view of the car is available in either local memory or on a remote server, a notification may be sent to the image capture device of a photographer at the a incident scene requesting that the photographer capture the desired image. In other embodiments, if no digital image in which the object of interest is depicted in accordance with the determined view characteristic is available, no further action is taken in response to the gesture.

Figure 10:
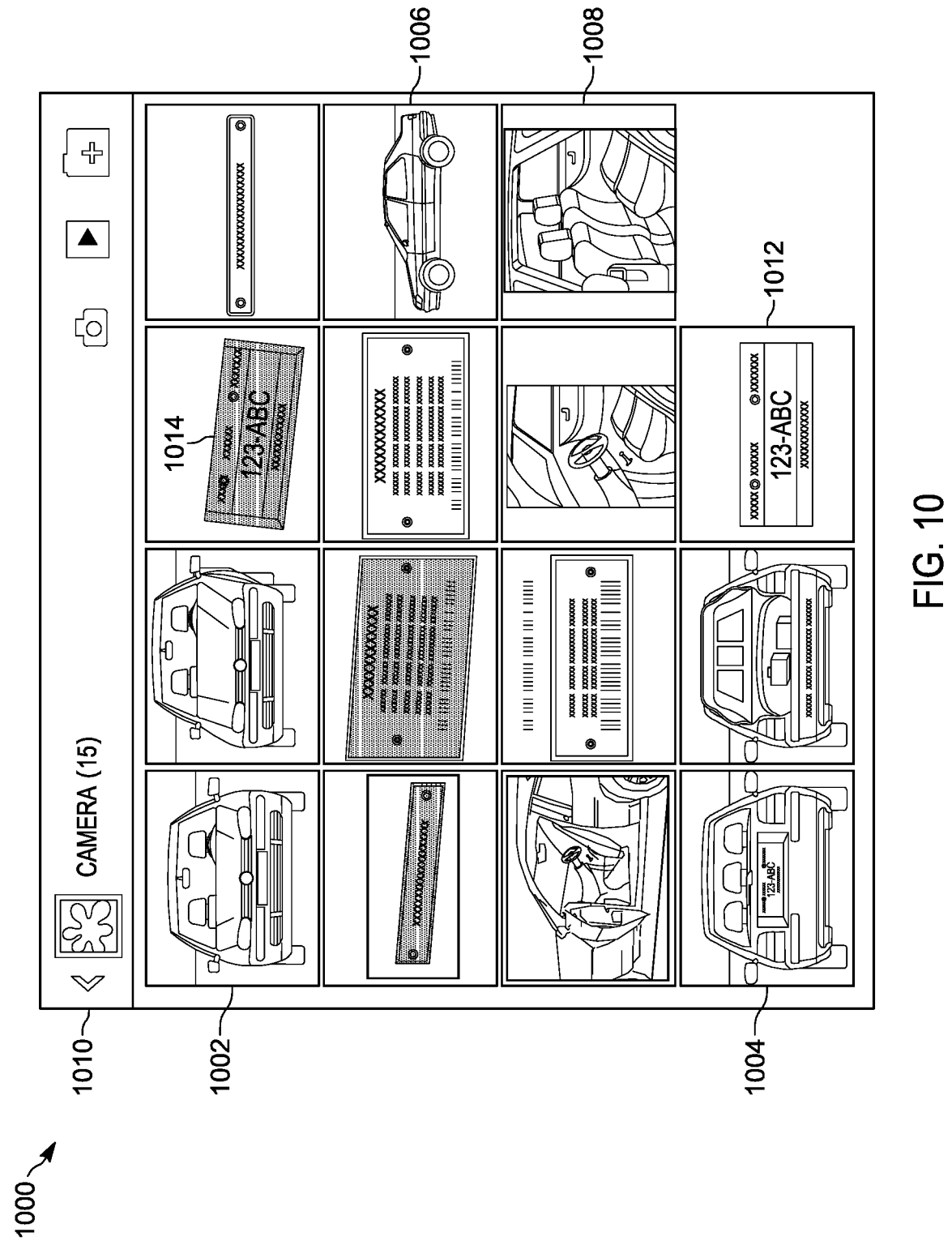
FIG. 10 is a block diagram illustrating selected views of an object of interest to be displayed on an electronic device, in accordance with some embodiments.

FIG. 10 is a block diagram illustrating selected views of an object of interest to be displayed on an electronic device 1000, in accordance with some embodiments. In this example, a composite of fifteen digital images depicting respective views in which a particular object of interest, a car, is present is presented in a display 1010 of electronic device 1000. As shown, some of the digital images are blurry or depict the car, or portions thereof, as being askew. The digital images may be arranged chronologically based on the times at which they were captured. In some embodiments, the digital images may have been captured in accordance with a predefined sequence for capturing digital images at the scene of a crime or other incident. When the fifteen digital images are arranged in the order shown, a traditional navigation mechanism may be used to move between the digital images. For example, if a viewer selects digital image 1006, which depicts a mid-range, left side view of the car for single display, and then wants to view digital image 1002, which depicts a front view of the car, multiple user interface actions, such as six taps or six left swipes, might be required to navigate to the desired digital image. In another example, navigating from digital image 1006 to digital image 1004, which depicts a back view of the car, might require five taps or five right swipes. Navigating between digital image 1006 and digital image 1008, which depicts an interior view of the car, might require four taps or four right swipes, even though the digital images appear as if they are adjacent to each other in the composite view shown in display 1010. Navigating from digital image 1004, which depicts the back view of the car, to a zoomed in view of the license plate might require ten left swipes to reach digital image 1014 or two right swipes to reach digital image 1012. In embodiments in which spatial orientation data was captured and associated with the digital images shown in FIG. 10 and one or more object of interest profile databases were created and populated as described herein, navigating between the digital images may be performed using an object-orientation-based navigation mechanism instead of, or in addition to, a traditional navigation mechanism.

Figure 11:
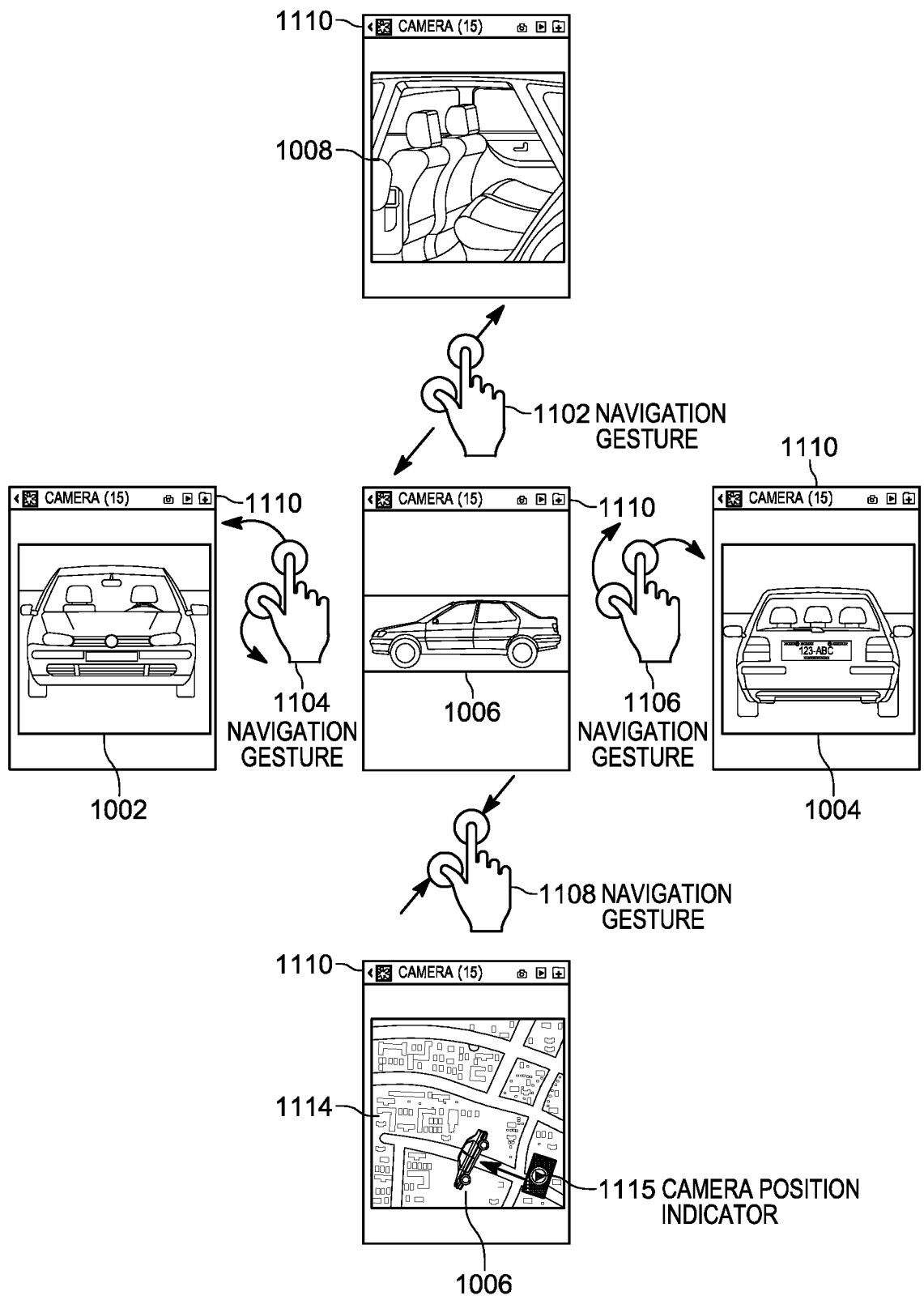
FIG. 11 illustrates the use of physical gestures to manipulate image data in order to display selected views of an object of interest, in accordance with some embodiments.

FIG. 11 illustrates the use of physical gestures to manipulate image data in order to display selected views of an object of interest, in accordance with some embodiments. Specifically, FIG. 11 illustrates the use of an object-orientation-based navigation mechanism to move between selected ones of the digital images illustrated in FIG. 10. In at least some embodiments, data representing each of multiple navigation gestures that are detectable and differentiable by the input interface of electronic device 1000 or display 1010 is mapped to a respective predefined view characteristic. Each view characteristic may indicate a predefined angle or distance relative to the digital image currently being displayed. The multiple navigation gestures may include at least one of a rotation gesture in a predefined direction, a zoom out gesture, and a zoom in gesture. For example, data representing a rotational gesture in which a static primary finger acts as a pivot point and a secondary finger swipes in a curved path may be mapped to a view characteristic in which the object of interest is rotated in the rotational direction of the gesture. Performing the rotational gesture may result in navigating to a digital image depicting the rotated view of the object of interest if a digital image depicting such a view is available. In some embodiments, a touch at the pivot point may be used to identify the object of interest within the currently displayed digital image.

In some embodiments, a zoom out gesture may be performed to zoom out from the digital image currently being displayed until the zoom out gesture exceeds its zooming limit. At that point, further performance of the zoom out gesture may result in navigating to a different digital image in which the object of interest is depicted as having the same orientation as the currently displayed digital image but a lower zoom level if such a view is available. If no such view is available, performing the zoom out gesture may result in navigating to a digital image that includes a representation of the object of interest displayed on a map view in the location and position at which the object is depicted in the currently displayed digital image. An indication of the shooting angle of a camera corresponding to the displayed view may also be displayed in the map view. In one example, a rotated view of the object of interest may be generated and displayed in accordance with the orientation of the object of interest with respective to the map. Similarly, a zoom in gesture may be performed to zoom into the digital image currently being displayed until the zoom in gesture exceeds its zooming limit. At that point, further performance of the zoom in gesture may result in navigating to a different digital image in which the object of interest is depicted as having the same orientation as the currently displayed digital image but a higher zoom level if such a view is available. In the limit, performing the zoom in gesture may result in navigating to a digital image that includes an interior view of the object of interest if such a view is available.

In the illustrated embodiment, digital image 1006, which represents a mid-range, left side view of the car, may be presented in display 1110. A first navigation gesture (navigation gesture 1102), which is a zoom in type gesture, may be performed to indicate that a user would like to view more details about the object of interest. In this case, a digital image in which the object of interest has the same orientation as in digital image 1006 but that was taken at a higher zoom level should be displayed next. For example, by repeatedly performing navigation gesture 1102, the user may navigate from a wide angle view of the object of interest to a mid-range view of the object of interest and then from the mid-range view of the object of interest to a close-up view of the object of interest. In some embodiments, if a user zooms in to a maximum zoom level, such as a zoom level beyond a predefined threshold or a zoom level at which no digital images of the object of interest are available, this may indicate that an internal view of the car should be displayed next. In this example, in response to detecting navigation gesture 1102, digital image 1008, which represents an interior view of the car, is selected for single display. If, instead of navigation gesture 1102, a second navigation gesture (navigation gesture 1104), which is a rotate left type gesture, is performed, this may indicate that a view of the car as if it were rotated to the left should be displayed next. In response to detecting navigation gesture 1104, digital image 1002, which represents a front view of the car, is selected for single display.

Similarly, if while digital image 1006 is displayed, a third navigation gesture (navigation gesture 1106), which is a rotate right type gesture, is performed, this may indicate that a view of the car as if it were rotated to the right should be displayed next. In response to detecting navigation gesture 1106, digital image 1004, which represents a back view of the car, is selected for single display. If a fourth navigation gesture (navigation gesture 1108), which is a zoom out type gesture, is performed while digital image 1006 is being displayed and if no digital image having the same orientation but a lower zoom level than that of digital image 1006 is available for display, a representation of the object of interest, namely, the car, may be displayed on a map view 1114 in the location and position at which the car is depicted in the other digital images. For example, the representation of the car may be displayed on map view 1114 such that it is facing the same direction, e.g., facing north or south, as the actual car. In this example, the map view 1114 is annotated with a camera position indicator 1115 showing the position of the camera that captured digital image 1006 when the digital image was captured.

Figure 12:
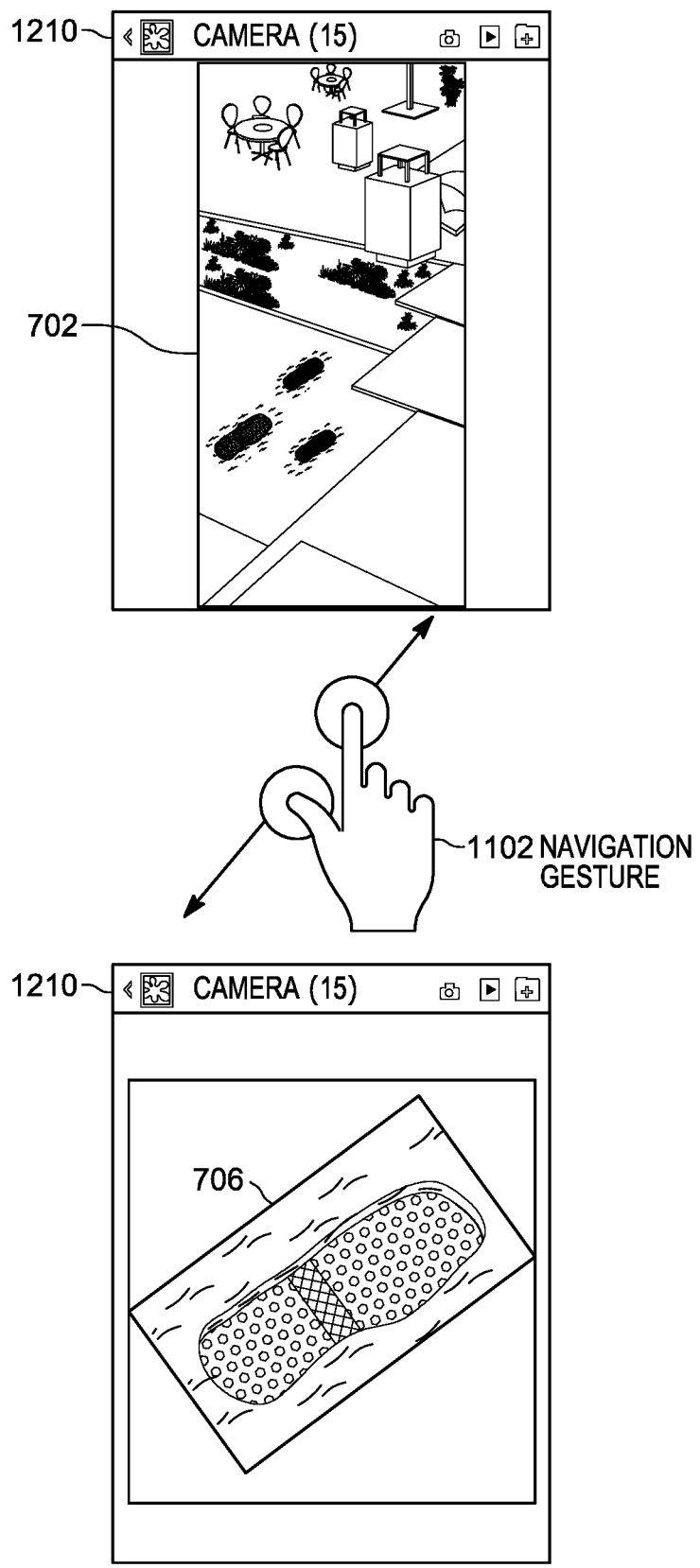
FIG. 12 illustrates the use of a physical gesture to manipulate image data in order to display and automatically align the orientation of an object of interest depicted in a digital image taken at a higher zoom level, in accordance with some embodiments.

FIG. 12 illustrates the use of a physical gesture to manipulate image data in order to display and automatically align the orientation of an object of interest depicted in a digital image at a higher zoom level, in accordance with some embodiments. In this example, while digital image 702 is presented on display 1210, navigation gesture 1102, which is a zoom in type gesture, is performed. In response to detecting navigation gesture 1102, a second digital image (digital image 706) in which the object of interest, a shoe print, is represented and in which the shoe print is depicted at a higher zoom level, is selected and prepared for single display. Preparing the digital image for single display may include, if it has not already been performed, rotating digital image 706 so that the orientation of the shoe print in digital image 706 is aligned with the orientation of the shoe print in digital image 702.

Figure 13:
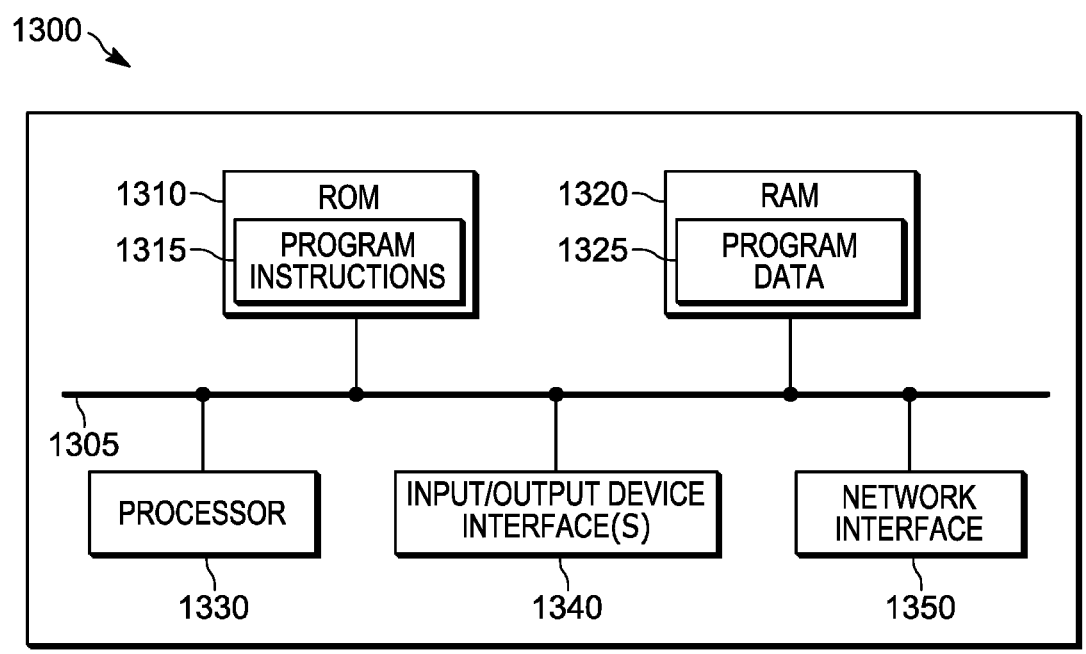
FIG. 13 is a block diagram illustrating an example photo gallery processing unit of an electronic device for processing digital image data representing multiple views of an object of interest, in accordance with some embodiments.

An electronic device for processing digital image data representing multiple views of an object of interest may include a photo gallery processing unit that is operable to perform, among other functions, all or a portion of the methods described herein. FIG. 13 is a block diagram illustrating an example photo gallery processing unit 1300 of an electronic image processing device, such as image processing device 120 illustrated in FIG. 1, in accordance with some embodiments. In the illustrated example, photo gallery processing unit 1300 includes a Read Only Memory (ROM) 1310, a Random Access Memory (RAM) 1320, an electronic processor 1330, one or more input/output device interfaces 1340 for communicating with locally attached devices and components, and a network interface 1350 for communicating with a remote server, such as remote server 130 illustrated in FIG. 1, all of which are coupled to a system bus 1305 through which they communicate with each other. In various embodiments, the electronic processor 1330 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 1310 stores program instructions 1315, at least some of which may be executed by the electronic processor 1330 to perform the methods described herein. For example, any or all of the operations of method 300 illustrated in FIG. 3, method 500 illustrated in FIG. 5, method 600 illustrated in FIG. 6, method 800 illustrated in FIG. 8, and method 900 illustrated in FIG. 9 may be performed by program instructions 1315 executing on electronic processor 1330 of photo gallery processing unit 1300. For example, program instructions 1315 may, when executed by electronic processor 1330, be operable to capture object-of-interest-focused metadata and associate the metadata with a digital image, create and populate object of interest profile datasets, identify objects of interest within image data, track the capture of prescribed views of various objects of interest, generate notifications indicating missing ones of the prescribed views, display digital images in an object-orientation-based manner, recognize navigation gestures, or provide object-orientation-based photo gallery navigation, among other functions. In some embodiments, program instructions 1315 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 1315 may include program instructions that when executed on photo gallery processing unit 1300 implement other functionality features of the electronic image processing device.

In this example embodiment, RAM 1320 may, from time to time, store program data 1325 including, without limitation, local copies of image data representing digital images and metadata associated with digital images, object of interest profile datasets, view checklists, gesture mappings, prescribed view definitions, or other data accessible by program instruction 1315 and used in performing the methods described herein. In some embodiments, RAM 1320 may also store data used in performing other functions of the electronic image processing device.

In this example embodiment, input/output device interfaces 1340 may include one or more analog input interfaces, such as one or more analog-to-digital (A/D) converters, or digital interfaces for receiving signals or data from, and sending signals or data to, one or more input/output devices. For example, photo gallery processing unit 1300 may communicate with a camera or other image capture device 110, augmented reality system 160, virtual assistant device 170, or display 128 illustrated in FIG. 1 through input/output device interfaces 1340. In some embodiments, input/output device interfaces 1340 may include one or more external memory interfaces through which photo gallery processing unit 1300 may be coupled to an external memory (not shown in FIG. 13). Such an external memory may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few.

In various embodiments, input/output device interfaces 1340 may operate to receive user input, to provide system output, or a combination of both. User input may be provided via, for example, a keyboard or keypad, a microphone, soft keys, icons, or soft buttons on a touch screen of display 128, a scroll ball, a mouse, buttons, and the like. Input/output device interfaces 1340 may also include other input mechanisms, which for brevity are not described herein and which may be implemented in hardware, software, or a combination of both. In some embodiments, input/output device interfaces 1340 may include a graphical user interface (GUI) generated, for example, by electronic processor 1330 from program instructions 1315 and program data 1325 and presented on display 128, enabling a user to interact with display 128.

The systems and methods described herein for processing digital image data representing multiple views of an object of interest may provide technical benefits over conventional photo gallery techniques. For example, by creating object of interest profile datasets and populating them with object-orientation-based metadata, these systems may implement an efficient method for navigating a photo gallery based on the detection, differentiation, and processing of user input gestures. In the disclosed systems, rather than creating a three-dimensional model from a large set of digital images, as in some existing photo gallery applications, a more sparse set of digital images is used in conjunction with object of interest profiling to provide a photo gallery solution that is purpose built for evidence-related workflows. In object of interest profiling, digital images in a photo gallery collection may be related to each other on the basis of common objects of interest represented in the images and physical orientation metadata, such as camera orientation attributes associated with the respective view of the object of interest depicted in each digital image. The object of interest profile datasets enable efficient tracking of photography sessions in which a set of prescribed views of an object of interest are meant to be captured, as well as object-orientation-based photo gallery navigation. The disclosed systems recognize a set of navigation gestures that enable a photographer or investigator to intuitively navigate among digital images in a collection of digital images, such as digital images in a photo gallery that depict different views of an object of interest, based at least on how they were physically related to each other when captured.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method of processing data associated with digital images, comprising the steps of:
   obtaining, for each of a plurality of previously captured digital images:
      image data representing a respective view of a scene depicted in the digital image; and
      spatial orientation data associated with the digital image;

identifying, using the image data, an object of interest present in the respective views of the scene depicted in two or more of the plurality of previously captured digital images;

creating a profile dataset for the identified object of interest, the profile dataset comprising, for each of the two or more previously captured digital images:

image association data representing a record of an association between the identified object of interest and the digital image; and view orientation data representing a record of a relationship between the respective view of the scene depicted in the digital image and the respective view of the scene depicted in another one of the two or more previously captured digital images, the view orientation data based at least on the spatial orientation data for the two or more previously captured digital images;

receiving, while a first one of the two or more previously captured digital images is displayed by a display device, data representing a first navigation gesture detected by an input interface, the received data being mapped to a first view characteristic indicative of a predefined view of the identified object of interest selected for display; and based at least on the received data, the first view characteristic, and the profile dataset for the identified object of interest:

identifying a second one of the two or more previously captured digital images having the first view characteristic; and initiating display of the identified second digital image by the display device.

2. The method of claim 1, wherein the first view characteristic indicates a view of the identified object of interest taken at a predefined view angle, a view of the identified object of interest taken at a predefined view distance, a view of the identified object of interest taken at a predefined zoom depth, an interior view of the identified object of interest, an exterior view of the identified object of interest, or a map view depicting a location of the identified object of interest.

3. The method of claim 1, wherein:
the first navigation gesture is one of a plurality of navigation gestures detectable and differentiable by the input interface; and
the plurality of navigation gestures comprises at least one of a rotation gesture in a predefined direction, a zoom out gesture, and a zoom in gesture.

4. The method of claim 1, wherein:
the spatial orientation data for each of the plurality of previously captured digital images comprises camera orientation attributes indicative of a position of a camera that captured the digital image relative to the respective view of the scene depicted in the digital image when the digital image was captured by the camera; and
creating the profile dataset for the identified object of interest comprises calculating, for each of the two or more previously captured digital images, the relationship between the respective view of the scene depicted in the digital image and the respective view of the scene depicted in the other one of the two or more previously captured digital images based at least on the camera orientation attributes for the two or more previously captured digital images.

5. The method of claim 1, wherein initiating the display of the identified second digital image by the display device comprises modifying the image data representing the respective view of the scene depicted in the identified second digital image to rotate the identified second digital image until the orientation of the identified object of interest in the identified second digital image is aligned with the orientation of the identified object of interest in the first digital image.

6. The method of claim 1, further comprising:
initiating simultaneous display of the two or more previously captured digital images by the display device, the initiating including modifying the image data representing the respective view of the scene depicted in at least one of the two or more previously captured digital images to rotate the at least one digital image until the orientation of the identified object of interest in all of the two or more previously captured digital images is aligned with the orientation of the identified object of interest in a selected one of the two or more previously captured digital images.

7. The method of claim 1, wherein:
the respective view of the scene depicted in each of the two or more previously captured digital images comprises one of a plurality of prescribed views of the identified object of interest;
the profile dataset for the identified object of interest further comprises a mapping between each of the two or more previously captured digital images and the respective one of the plurality of prescribed views depicted in the digital image; and
the method further comprises:
determining, based at least on the profile dataset for the identified object of interest, whether all of the plurality of prescribed views of the identified object of interest have been identified in the image data; and
generating, in response to determining that one of the plurality of prescribed views has not been identified in the image data, a notification indicating the one of the plurality of prescribed views of the identified object of interest that has not been identified in the image data.

8. The method of claim 7, wherein generating the notification indicating the one of the plurality of prescribed views of the identified object of interest that has not been identified in the image data comprises generating an augmented reality visualization depicting at least one of a location at which a digital image including the identified object of interest should be captured, a distance from which a digital image including the identified object of interest should be captured, and a direction from which a digital image including the identified object of interest should be captured.

9. The method of claim 7, wherein:
the method further comprises determining that a photography session for obtaining the plurality of prescribed views of the identified object of interest is ending; and
determining whether all of the plurality of prescribed views of the identified object of interest have been identified in the image data is performed in response to determining that the photography session is ending.

10. The method of claim 9, wherein determining that the photography session for obtaining the plurality of prescribed view of the identified object of interest is ending comprises at least one of detecting that one of the two or more previously captured digital images is being viewed in a photo gallery application, detecting that a predetermined amount of time has passed since a digital image was captured by a camera that captured one of the two or more previously captured digital images, detecting that a predetermined ending time for the photography session has been reached, detecting that a photographer or camera that captured one of the two or more previously captured digital images has crossed a predetermined geofence boundary, or detecting that a photographer or camera that captured one of the two or more previously captured digital images has entered a vehicle.

11. The method of claim 1, wherein:
the method further comprises obtaining, for each of the plurality of previously captured digital images, at least one of timestamp data indicating when the digital image was taken and location data indicating where the digital image was taken; and
creating the profile dataset for the identified object of interest further comprises at least one of:
determining, based at least on timestamp data for the two or more previously captured digital images, that the two or more previously captured digital images were taken within a window of time of a predetermined length; and
determining, based at least on location data for the two or more previously captured digital images, that the two or more previously captured digital images were taken within a physical area of a predetermined size.

12. An electronic image processing device, comprising:
a display device;
input interface circuitry operable to detect and differentiate a plurality of navigation gestures, wherein data representing each of the plurality of navigation gestures is mapped to a respective predefined view characteristic; and
a photo gallery processing unit operable to:
obtain, for each of a plurality of previously captured digital images:
image data representing a respective view of a scene depicted in the digital image; and
spatial orientation data associated with the digital image;
identify, using the image data, an object of interest present in the respective views of the scene depicted in two or more of the plurality of previously captured digital images;
create a profile dataset for the identified object of interest, the profile dataset comprising, for each of the two or more previously captured digital images:
image association data representing a record of an association between the identified object of interest and the digital image; and
view orientation data representing a record of a relationship between the respective view of the scene depicted in the digital image and the respective view of the scene depicted in another one of the two or more previously captured digital images, the view orientation data based at least on the spatial orientation data for the two or more previously captured digital images;
receive, while a first one of the two or more previously captured digital images is displayed by the display device, data representing a first navigation gesture detected by an input interface, the received data being mapped to a first view characteristic indicative of a predefined view of the identified object of interest selected for display; and
based at least on the received data, the first view characteristic, and the profile dataset for the identified object of interest:

identify a second one of the two or more previously captured digital images having the first view characteristic; and
initiate display of the identified second digital image by the display device.

13. The electronic image processing device of claim 12, wherein:
the spatial orientation data for each of the plurality of previously captured digital images comprises camera orientation attributes indicative of a position of a camera that captured the digital image relative to the respective view of the scene depicted in the digital image when the digital image was captured by the camera; and
to create the profile dataset for the identified object of interest, the photo gallery processing unit is operable to, for each of the two or more previously captured digital images, calculate the relationship between the respective view of the scene depicted in the digital image and the respective view of the scene depicted in the other one of the two or more previously captured digital images based at least on the camera orientation attributes for the two or more previously captured digital images.

14. The electronic image processing device of claim 12, wherein to initiate the display of the identified second digital image by the display device, the photo gallery processing unit is operable to modify the image data representing the respective view of the scene depicted in the identified second digital image to rotate the identified second digital image until the orientation of the identified object of interest in the identified second digital image is aligned with the orientation of the identified object of interest in the first digital image.

15. The electronic image processing device of claim 12, wherein the photo gallery processing unit is further operable to:
determine that none of the two or more previously captured digital images has the first view characteristic;
generate a notification requesting that a digital image having the first view characteristic should be captured; and
transmit the notification requesting that a digital image having the first view characteristic should be captured to an image capture device selected based at least on its location.

16. The electronic image processing device of claim 12, wherein the photo gallery processing unit is further operable to initiate simultaneous display of the two or more previously captured digital images by the display device, the initiating including modifying the image data representing the respective view of the scene depicted in at least one of the two or more previously captured digital images to rotate the at least one digital image until the orientation of the identified object of interest in all of the two or more previously captured digital images is aligned with the orientation of the identified object of interest in a selected one of the two or more previously captured digital images.

17. The electronic image processing device of claim 12, wherein:
the respective view of the scene depicted in each of the two or more previously captured digital images comprises one of a plurality of prescribed views of the identified object of interest;
the profile dataset for the identified object of interest further comprises a mapping between each of the two or more previously captured digital images and the respective one of the plurality of prescribed views depicted in the digital image; and the photo gallery processing unit is further operable to:
  determine, based at least on the profile dataset for the identified object of interest, whether all of the plurality of prescribed views of the identified object of interest have been identified in the image data; and
  generate, in response to determining that one of the plurality of prescribed views has not been identified in the image data, a notification indicating the one of the plurality of prescribed views of the identified object of interest that has not been identified in the image data.

18. The electronic image processing device of claim 17, wherein:
  the photo gallery processing unit is further operable to determine that a photography session for obtaining the plurality of prescribed views of the identified object of interest is ending;
  determining whether all of the plurality of prescribed views of the identified object of interest have been identified in the image data is performed in response to a determination that the photography session is ending; and
  determining that the photography session for obtaining the plurality of prescribed view of the identified object of interest is ending comprises at least one of detecting that one of the two or more previously captured digital images is being viewed in a photo gallery application, detecting that a predetermined amount of time has passed since a digital image was captured by a camera that captured one of the two or more previously captured digital images, detecting that a predetermined ending time for the photography session has been reached, detecting that a photographer or camera that captured one of the two or more previously captured digital images has crossed a predetermined geofence boundary, or detecting that a photographer or camera that captured one of the two or more previously captured digital images has entered a vehicle.

19. A non-transitory, computer-readable storage medium having program instructions stored thereon that when executed by an electronic processor cause the electronic processor to perform:
  obtaining, for each of a plurality of previously captured digital images:
    image data representing a respective view of a scene depicted in the digital image; and
    spatial orientation data associated with the digital image;
  identifying, using the image data, an object of interest present in the respective views of the scene depicted in two or more of the plurality of previously captured digital images;
  creating a profile dataset for the identified object of interest, the profile dataset comprising, for each of the two or more previously captured digital images:
    image association data representing a record of an association between the identified object of interest and the digital image; and
    view orientation data representing a record of a relationship between the respective view of the scene depicted in the digital image and the respective view of the scene depicted in another one of the two or more previously captured digital images, the view orientation data based at least on the spatial orientation data for the two or more previously captured digital images;
  receiving, while a first one of the two or more previously captured digital images is displayed by a display device, data representing a first navigation gesture detected by an input interface, the received data being mapped to a first view characteristic indicative of a predefined view of the identified object of interest selected for display; and
  based at least on the received data, the first view characteristic, and the profile dataset for the identified object of interest:
    identifying a second one of the two or more previously captured digital images having the first view characteristic; and
    initiating display of the identified second digital image by the display device.

20. The non-transitory, computer-readable storage medium of claim 19, wherein:
  the respective view of the scene depicted in each of the two or more previously captured digital images comprises one of a plurality of prescribed views of the identified object of interest;
  the profile dataset for the identified object of interest further comprises a mapping between each of the two or more previously captured digital images and the respective one of the plurality of prescribed views depicted in the digital image; and
  when executed by the electronic processor, the program instructions further cause the electronic processor to perform:
    determining, based at least on the profile dataset for the identified object of interest, whether all of the plurality of prescribed views of the identified object of interest have been identified in the image data; and
    generating, in response to determining that one of the plurality of prescribed views has not been identified in the image data, a notification indicating the one of the plurality of prescribed views of the identified object of interest that has not been identified in the image data.

* * * * *